United States Patent
Wang et al.

(10) Patent No.: US 12,229,244 B2
(45) Date of Patent: Feb. 18, 2025

(54) METHOD FOR MANUFACTURING AND STARTING UP BATTERY MANAGEMENT SYSTEM

(71) Applicant: CONTEMPORARY AMPEREX TECHNOLOGY (HONG KONG) LIMITED, Hong Kong (CN)

(72) Inventors: Chao Wang, Ningde (CN); Tingda Lin, Ningde (CN); Jihai Xie, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 241 days.

(21) Appl. No.: 17/978,903

(22) Filed: Nov. 1, 2022

(65) Prior Publication Data

US 2023/0222206 A1     Jul. 13, 2023

Related U.S. Application Data

(63) Continuation of application No. PCT/CN2022/094250, filed on May 20, 2022.

(30) Foreign Application Priority Data

Jan. 7, 2022 (CN) .......................... 202210019089.0

(51) Int. Cl.
    *G06F 21/45*     (2013.01)
    *G06F 21/57*     (2013.01)
    *G06F 21/62*     (2013.01)

(52) U.S. Cl.
    CPC ............ *G06F 21/45* (2013.01); *G06F 21/572* (2013.01); *G06F 21/6218* (2013.01); *G06F 2221/034* (2013.01)

(58) Field of Classification Search
    CPC .... G06F 21/45; G06F 21/572; G06F 21/6218; G06F 2221/034; G06F 21/57;
(Continued)

(56) References Cited

U.S. PATENT DOCUMENTS

| | | | |
|---|---|---|---|
| 2011/0066309 A1 | 3/2011 | Matsuoka et al. | |
| 2013/0124840 A1* | 5/2013 | Diluoffo | G06F 21/575 713/2 |
| 2020/0175105 A1 | 6/2020 | Falk et al. | |

FOREIGN PATENT DOCUMENTS

| | | | |
|---|---|---|---|
| CN | 101221613 A | | 7/2008 |
| CN | 101655814 A | * | 2/2010 |

(Continued)

OTHER PUBLICATIONS

Korean Intellectual Property Office (KIPO) Office Action 1 for Application No. 2022-7029898 Jun. 14, 2024 13 Pages (including translation).

(Continued)

*Primary Examiner* — Henry Tsang
(74) *Attorney, Agent, or Firm* — Anova Law Group, PLLC

(57) ABSTRACT

The present application relates to a method for manufacturing a battery management system and a method for starting up a battery management system. The battery management system includes a plurality of battery management units, the plurality of battery management units include a first battery management unit and a second battery management unit, the first battery management unit includes a main core micro control unit, a first data transmission micro control unit and a hardware security module, and the second battery management unit includes a second data transmission micro control unit. According to the embodiments of the present application, a comprehensive verification for the battery (Continued)

management system including a plurality of battery management units can be achieved with one hardware security module.

15 Claims, 11 Drawing Sheets

(58) Field of Classification Search
CPC .......... G06F 21/602; Y02E 60/10; H02J 7/00; H04L 9/0877; H04L 9/3242; H04L 63/0421
See application file for complete search history.

(56) References Cited

FOREIGN PATENT DOCUMENTS

| | | | | |
|---|---|---|---|---|
| CN | 105895973 | A | 8/2016 | |
| CN | 206364145 | U | 7/2017 | |
| CN | 110417808 | A | 11/2019 | |
| CN | 111391711 | A | 7/2020 | |
| CN | 112069502 | A * | 12/2020 | ............. B60R 25/24 |
| CN | 112241306 | A | 1/2021 | |
| CN | 112653559 | A | 4/2021 | |
| CN | 112702166 | A | 4/2021 | |
| CN | 112966254 | A | 6/2021 | |
| CN | 113516376 | A | 10/2021 | |
| EP | 3082215 | A1 | 10/2016 | |
| JP | 2011065752 | A | 3/2011 | |
| JP | 2015201091 | A | 11/2015 | |
| JP | 2017022968 | A | 1/2017 | |
| JP | 2019047726 | A | 3/2019 | |
| KR | 20200049773 | A | 5/2020 | |
| KR | 20210051462 | A | 5/2021 | |

OTHER PUBLICATIONS

Japan Patent Office (JPO) Decision to Grant a Patent For JP Application No. 2022-552288 Apr. 30, 2024 5 Pages (including translation).
Japan Patent Office (JPO) Notice of Reasons for Refusal For JP Application No. 2022-552288 Feb. 13, 2024 8 Pages (including translation).
International Search Report and Written Opinion, PCTCN2022094250, Sep. 26, 2022, 11 pgs.
China National Intellectual Property Administration (CNIPA) Notice of Grant of Invention Patent Right for Application No. 202210019089.0 Nov. 3, 2023 6 pages (including translation).
China National Intellectual Property Administration (CNIPA) Office Action 1 for 202210019089.0 Sep. 5, 2023 7 Pages (including translation).
Yuanyuan Zhou, "Analysis and application of vehicle network information security test technology", Apr. 25, 2020, Beijing Automobile,2020 No.2, p. 23-27, Beijing, China.
The European Patent Office (EPO) The Extended European Search Report for 22790198.0 Nov. 16, 2023 9 Pages.
The Japan Patent Office (JPO) Notification of Reasons for Refusal for Application No. 2022-552288 Feb. 13, 2024 8 Pages (including translation).

* cited by examiner

METHOD FOR MANUFACTURING AND STARTING UP BATTERY MANAGEMENT SYSTEM

CROSS-REFERENCE TO RELATED APPLICATIONS

This application is a continuation application of PCT Patent Application No. PCT/CN2022/094250, entitled "METHOD FOR MANUFACTURING AND STARTING UP BATTERY MANAGEMENT SYSTEM" filed on May 20, 2022, which claims priority to Chinese Patent Application No. 202210019089.0, filed with the State Intellectual Property Office of the People's Republic of China on Jan. 7, 2022, and entitled "METHOD FOR MANUFACTURING AND STARTING UP BATTERY MANAGEMENT SYSTEM", all of which are incorporated herein by reference in their entirety.

TECHNICAL FIELD

The present application relates to the field of battery, and in particular, to a method and apparatus for manufacturing a battery management system, a method for starting up a battery management system, a hardware security module, a main core micro control unit, a data transmission micro control unit, a battery management unit, a battery management system, a battery, an electrical device, an electronic device, a computer readable storage medium, and a computer program product.

BACKGROUND

Energy saving and emission reduction is the key to the sustainable development of the automobile industry. Electric vehicles have become an important part of the sustainable development of the automobile industry due to their advantages such as energy saving and environmental protection. For electric vehicles, battery technology is a significant factor for their development.

The battery management system (BMS) of an electric vehicle needs to be started up securely to avoid malicious tampering of software programs, which threatens the safety of the vehicle. Nonetheless, the existing secure start up solutions usually verify the main chip of one battery management unit. For a battery management system including a plurality of battery management units, there is no reliable method to verify each of the plurality of battery management units to achieve a comprehensive verification for the battery management system. Therefore, the safety of the battery management system including a plurality of battery management units cannot be guaranteed.

SUMMARY

For the above problems, the present application provides a method for manufacturing and starting up a battery management system, which is able to comprehensively verify the battery management system including a plurality of battery management units when the battery management system is started up, so as to ensure the safety of the battery management system.

In a first aspect, the present application provides a method for manufacturing a battery management system including a plurality of battery management units, the plurality of battery management units including a first battery management unit and a second battery management unit, the first battery management unit including a main core micro control unit, a first data transmission micro control unit and a hardware security module, the second battery management unit including a second data transmission micro control unit, and the method including: obtaining a main core message authentication code based on firmware data of the main core micro control unit; obtaining a first data transmission message authentication code based on firmware data of the first data transmission micro control unit, and obtaining a second data transmission message authentication code based on firmware data of the second data transmission micro control unit; and configuring the hardware security module based on the main core message authentication code, the first data transmission message authentication code and the second data transmission message authentication code, so that the battery management system verifies the plurality of battery management units based on the hardware security module at starting up.

In the technical solutions of the embodiments of the present application, in manufacturing the battery management system, for the data transmission micro control unit of each of the plurality of battery management units included in the battery management system, a corresponding data transmission message authentication code is obtained based on the firmware data of the data transmission micro control unit, and for the main core micro control unit, the main core message authentication code is obtained based on the firmware data of the main core micro control unit. Finally, the hardware security module is configured based on the obtained corresponding data transmission message authentication codes and the main core message authentication code, so that the battery management system is able to separately verify the firmware data of each of the plurality of battery management units included in the battery management system based on the configured hardware security module at starting up. A comprehensive verification is achieved for the battery management system including a plurality of battery management units, thereby avoiding the firmware data of the data transmission micro control unit of any one of the battery management units from being tampered, which affects the security of the battery management system. Moreover, in the technical solutions of the embodiments of the present application, only one hardware security module can be utilized to verify each of the plurality of battery management units included in the battery management system, the manufacturing cost of the battery management system is reduced.

In some embodiments, obtaining a main core message authentication code based on firmware data of the main core micro control unit includes: generating a secret key uniquely corresponding to the battery management unit; and obtaining the main core message authentication code based on the secret key and the firmware data of the main core micro control unit; and configuring the hardware security module based on the main core message authentication code, the first data transmission message authentication code and the second data transmission message authentication code further includes: configuring the hardware security module based on the secret key, the main core message authentication code and the plurality of data transmission message authentication codes. The secret key uniquely corresponding to the main core micro control unit is generated, and the main core message authentication code of the main core micro control unit is generated based on the secret key and the firmware data of the main core micro control unit, since the secret key is uniquely corresponding to the battery management unit, an one-to-one correspondence is achieved between the secret key and the battery management unit, and the safety of the battery management system is further ensured.

In some embodiments, obtaining a first data transmission message authentication code based on firmware data of the first data transmission micro control unit, and obtaining a second data transmission message authentication code based on firmware data of the second data transmission micro control unit include: for each of the first data transmission micro control unit and the second data transmission micro control unit: obtaining firmware data and hardware data of the data transmission micro control unit; and obtaining a data transmission message authentication code of the data transmission micro control unit based on the firmware data and the hardware data of the data transmission micro control unit. In obtaining the data transmission message authentication code based on the firmware data of the data transmission micro control unit of each of the plurality of battery management units, the data transmission message authentication code is obtained further based on the hardware data, so that the obtained data transmission message authentication code is further associated with the hardware data. Then, when the battery management system verifies each of the plurality of battery management units based on the configured hardware security module at starting up, the hardware data is further verified, which avoids the hardware of the data transmission micro control unit of each of the plurality of battery management units from being replaced, the safety of the battery management system is further ensured.

In a second aspect, the present application provides a method for starting up a battery management system including a plurality of battery management units, the plurality of battery management units including a first battery management unit and a second battery management unit, the first battery management unit including a main core micro control unit and a first data transmission micro control unit, the second battery management unit including a second data transmission micro control unit, the main core micro control unit having a corresponding main core message authentication code, the first data transmission micro control unit having a corresponding first data transmission message authentication code and the second data transmission micro control unit having a corresponding second data transmission message authentication code, and the method including: obtaining firmware data from the main core micro control unit in response to a starting up instruction for the battery management system; verifying the main core micro control unit based on the firmware data of the main core micro control unit and the main core message authentication code; obtaining verification data from the main core micro control unit in response to the main core micro control unit passing the verification, the verification data being corresponding to one of the first data transmission micro control unit and the second data transmission micro control unit and including firmware data of the one of the first data transmission micro control unit and the second data transmission micro control unit; and verifying the one of the first data transmission micro control unit and the second data transmission micro control unit based on the verification data.

In the technical solutions of the embodiments of the present application, in starting up the battery management system, the main core micro control unit is first verified based on the firmware data of the main core micro control unit and the main core message authentication code, and after the main core micro control unit passes the verification, the verification data of each of the plurality of data transmission micro control units of the plurality of battery management units included in the battery management system is obtained from the main core micro control unit, and the verification data includes the firmware data of the corresponding data transmission micro control unit. The plurality of data transmission micro control units of the plurality of battery management units are separately verified based on the obtained verification data, and thus a comprehensive verification is achieved for the battery management system including a plurality of battery management units, thereby avoiding the firmware data of the data transmission micro control unit of any one of the battery management units from being tampered, which affects the security of the battery management system. In addition, in the technical solutions of the embodiments of the present application, the hardware security module installed in the battery management unit in which the main core micro control unit is located can be utilized to verify each of the plurality of battery management units included in the battery management system, the manufacturing cost is low.

In some embodiments, the main core micro control unit has a unique corresponding secret key, and verifying the main core micro control unit based on the firmware data of the main core micro control unit and the main core message authentication code includes: verifying the main core micro control unit based on the firmware data of the main core micro control unit, the secret key and the main core message authentication code. The main core micro control unit is verified further based on the secret key uniquely corresponding to the main core micro control unit, and since the secret key is uniquely corresponding to the system management unit, an one-to-one correspondence is achieved between the secret key and the system management unit, and the safety of the battery management system is further ensured.

In some embodiments, obtaining verification data from the main core micro control unit includes: sending an instruction for starting up the main core micro control unit to start up the main core micro control unit, herein after the main core micro control unit is started up, a communication connection is established between the main core micro control unit and the first data transmission micro control unit; and obtaining the verification data in response to the communication connection being established between the main core micro control unit and the first data transmission micro control unit, herein the verification data is corresponding to the first data transmission micro control unit. After the main core micro control unit is verified and started up, with the communication connection established between the main core micro control unit and the first data transmission micro control unit, the main core micro control unit obtains the verification data corresponding to the first data transmission micro control unit, so that the verification data of the first data transmission micro control unit can be obtained through the main core micro control unit and no additional data transmission structure is required, thus the cost is further reduced.

In some embodiments, after the main core micro control unit is started up, a communication connection is established between the first data transmission micro control unit and the second data transmission micro control unit, and obtaining verification data from the main core micro control unit further includes: obtaining the verification data in response to the first data transmission micro control unit passing the verification and the communication connection being established between the first data transmission micro control unit and the second data transmission micro control unit, herein the verification data is corresponding to the second data transmission micro control unit. After the main core micro control unit is verified and started up, with the communication connection established between the main core micro control unit and the first data transmission micro control unit and the communication connection established between the first data transmission micro control unit and the second data transmission micro control unit, the first data transmission micro control unit obtains the verification data sent by the second data transmission micro control unit and further sends the obtained verification data to the main core micro control unit, so that the verification data of the second data transmission micro control unit can be obtained through the main core micro control unit and the first data transmission micro control unit and no additional data transmission structure is required, thus the cost of the battery management system is further reduced.

In some embodiments, the verification data further includes hardware data of the one of the first data transmission micro control unit and the second data transmission micro control unit. The data transmission micro control unit of each of the plurality of battery management units in the battery management system is verified further based on the hardware data, which can further prevent the hardware of the data transmission micro control unit of each of the plurality of battery management units from being replaced, and the safety of the battery management system is further ensured.

In some embodiments, the method further includes: sending, in response to the main core micro control unit failing to pass the verification, a starting up termination instruction to terminate the starting up of the battery management system. If the main core micro control unit fails to pass the verification, the starting up termination instruction is sent to terminate the starting up of the battery management system, so as to avoid subsequent invalid verification and prevent the battery management system from starting up and causing safety problems.

In a third aspect, the present application provides a method for starting up a battery management system including a plurality of battery management units, the plurality of battery management units including at least a first battery management unit and a second battery management unit, the first battery management unit including a first data transmission micro control unit and a hardware security module, the second battery management unit including a second data transmission micro control unit, and the method including: receiving verification data, herein the verification data is corresponding to one of the first data transmission micro control unit and the second data transmission micro control unit and includes firmware data of the one of the first data transmission micro control unit and the second data transmission micro control unit; and sending the verification data to the hardware security module, so that the hardware security module verifies the one of the first data transmission micro control unit and the second data transmission micro control unit based on the verification data.

In the technical solutions of the embodiments of the present application, in starting up the battery management system, the verification data of the data transmission micro control unit of any one of the plurality of battery management units included in the battery management system is sent to the hardware security module, and the verification data includes the firmware data. The hardware security module can verify the data transmission micro control unit of any one of the plurality of battery management units based on the obtained verification data, a comprehensive verification can be achieved for the battery management system, thereby avoiding the firmware data of the data transmission micro control unit of any one of the battery management units from being tampered, which affects the security of the battery management system. In addition, in the technical solutions of the embodiments of the present application, through receiving and sending the verification data, one hardware security module can be utilized to verify each of the plurality of battery management units included in the battery management system, the manufacturing cost of the battery management system is reduced.

In some embodiments, the verification data further includes hardware data of the one of the first data transmission micro control unit and the second data transmission micro control unit. In the technical solutions of the embodiments of the present application, the verification data further includes the hardware data, so that the data transmission micro control unit of each of the plurality of battery management units in the battery management system is verified further based on the hardware data, which can further prevent the hardware of the data transmission micro control unit of each of the plurality of battery management units from being replaced, and the safety of the battery management system is further ensured.

In some embodiments, the method further includes: sending, in response to the one of the first data transmission micro control unit and the second data transmission micro control unit failing to pass the verification, a fault alarm to indicate that the one of the first data transmission micro control unit and the second data transmission micro control unit is faulty. If the data transmission micro control unit fails to pass the verification, the fault alarm, which indicates that the data transmission micro control unit corresponding to the verification data is faulty, is sent to inform the user of the faulty battery management unit, without affecting the normal starting up of other verified battery management units.

In a fourth aspect, the present application provides a method for starting up a battery management system including a plurality of battery management units, the plurality of battery management units including at least a first battery management unit and a second battery management unit, the first battery management unit including a main core micro control unit, a first data transmission micro control unit and a hardware security module, the second battery management unit including a second data transmission micro control unit, and the method including: sending verification data, so that the main core micro control unit receives the verification data and sends the verification data to the hardware security module, and the hardware security module verifies a corresponding one of the first data transmission micro control unit and the second data transmission micro control unit based on the verification data, herein the verification data is corresponding to one of the first data transmission micro control unit and the second data transmission micro control unit and includes firmware data of the one of the first data transmission micro control unit and the second data transmission micro control unit.

In the technical solutions of the embodiments of the present application, in starting up the battery management system, the verification data including the firmware data of the first data transmission micro control unit of the first battery management unit or the second data transmission micro control unit of the second battery management unit is sent to the main core micro control unit, and further sent to the hardware security module by the main core micro control unit. The hardware security module verifies the data transmission micro control unit corresponding to the firmware data based on the received verification data, a comprehensive verification can be achieved for the battery management system, thereby avoiding the firmware data of the data transmission micro control unit of any one of the battery management units from being tampered, which affects the security of the battery management system. In addition, the verification data is sent to the main core micro control unit and further sent to the hardware security module by the main core micro control unit, one hardware security module and one main core micro control unit can be utilized to verify each of the plurality of battery management units included in the battery management system, the manufacturing cost is low.

In some embodiments, the verification data is corresponding to the second data transmission micro control unit, and the method further includes: receiving encrypted data sent by the second data transmission micro control unit; and decrypting the encrypted data to obtain the verification data. In starting up the battery management system, the encrypted data is received from the second data transmission micro control unit and decrypted to obtain the verification data, so that the transmission of the verification data of the second data transmission micro control unit is encrypted, which ensures the security of at least the verification data from the second data transmission micro control unit, and further ensures the security of the starting up of the battery management system.

In some embodiments, the verification data is corresponding to the second data transmission micro control unit, and sending verification data includes: encrypting the verification data to obtain encrypted data; and sending the encrypted data to the first data transmission micro control unit, so that the first data transmission micro control unit decrypts the encrypted data and sends the data to the main core micro control unit. The verification data including the firmware data of the second data transmission micro control unit of the second battery management unit is encrypted and then sent to the first data transmission micro control unit of the first battery management unit, and sent to the main core micro control unit by the first data transmission micro control unit of the first battery management unit, and further sent to the hardware security module. The hardware security module verifies the data transmission micro control unit corresponding to the firmware data based on the received verification data, a comprehensive verification can be achieved for the battery management system, thereby avoiding the firmware data of the data transmission micro control unit of any one of the battery management units from being tampered, which affects the security of the battery management system.

In some embodiments, the verification data further includes hardware data of the second data transmission micro control unit. The sent verification data further includes the hardware data, so that the data transmission micro control unit of each of the plurality of battery management units in the battery management system is verified further based on the hardware data, which can further prevent the hardware of the data transmission micro control unit of each of the plurality of battery management units from being replaced, and the safety of the battery management system is further ensured.

In a fifth aspect, the present application provides an apparatus for manufacturing a battery management system including a plurality of battery management units, the plurality of battery management units including a first battery management unit and a second battery management unit, the first battery management unit including a main core micro control unit, a first data transmission micro control unit and a hardware security module, the second battery management unit including a second data transmission micro control unit, and the apparatus including: a first obtaining unit configured to obtain a main core message authentication code based on firmware data of the main core micro control unit; a second obtaining unit configured to obtain a first data transmission message authentication code based on firmware data of the first data transmission micro control unit, and obtain a second data transmission message authentication code based on firmware data of the second data transmission micro control unit; and a configuring unit configured to configure the hardware security module based on the main core message authentication code, the first data transmission message authentication code and the second data transmission message authentication code, so that the battery management system verifies the plurality of battery management units based on the hardware security module at starting up.

In some embodiments, the first obtaining unit includes: a secret key generating unit configured to generate a secret key uniquely corresponding to the battery management unit; and a first obtaining subunit configured to obtain the main core message authentication code based on the secret key and the firmware data of the main core micro control unit, herein the configuring unit is configured to: configure the battery management system based on the secret key, the main core message authentication code and the plurality of data transmission message authentication codes.

In some embodiments, the second obtaining unit includes: a second obtaining subunit configured to, for each of the first data transmission micro control unit and the second data transmission micro control unit, obtain firmware data and hardware data of the data transmission micro control unit; and a third obtaining subunit configured to, for each of the first data transmission micro control unit and the second data transmission micro control unit, obtain a data transmission message authentication code of the data transmission micro control unit based on the firmware data and the hardware data of the data transmission micro control unit.

In a sixth aspect, the present application provides a hardware security module for starting up a battery management system including a plurality of battery management units, the plurality of battery management units including a first battery management unit and a second battery management unit, the first battery management unit including a main core micro control unit, a first data transmission micro control unit and the hardware security module, the second battery management unit including a second data transmission micro control unit, the main core micro control unit having a corresponding main core message authentication code, the first data transmission micro control unit having a corresponding first data transmission message authentication code and the second data transmission micro control unit having a corresponding second data transmission message authentication code, and the hardware security module including: a first responding unit configured to obtain firmware data from the main core micro control unit in response to a starting up instruction for the battery management system; a first verifying unit configured to verify the main core micro control unit based on the firmware data of the main core micro control unit and the main core message authentication code; a second responding unit configured to obtain verification data from the main core micro control unit in response to the main core micro control unit passing the verification, the verification data being corresponding to one of the first data transmission micro control unit and the second data transmission micro control unit and including firmware data of the one of the first data transmission micro control unit and the second data transmission micro control unit; and a second verifying unit configured to verify the one of the first data transmission micro control unit and the second data transmission micro control unit based on the verification data.

In the technical solutions of the embodiments of the present application, in starting up the battery management system, the main core micro control unit is first verified, by the hardware security module, based on the firmware data of the main core micro control unit and the main core message authentication code, and after the main core micro control unit passes the verification, the verification data of the plurality of data transmission micro control units of the plurality of battery management units included in the battery management system is obtained from the main core micro control unit, and the verification data includes the firmware data of the corresponding data transmission micro control unit. The plurality of data transmission micro control units of the plurality of battery management units are separately verified based on the obtained verification data, and thus a comprehensive verification is achieved for the battery management system including a plurality of battery management units, thereby avoiding the firmware data of the data transmission micro control unit of any one of the battery management units from being tampered, which affects the security of the battery management system. In addition, in the technical solutions of the embodiments of the present application, one hardware security module can be utilized to verify each of the plurality of battery management units included in the battery management system, the manufacturing cost is low.

In some embodiments, the main core micro control unit has a unique corresponding secret key, and the first verifying unit is further configured to: verify the main core micro control unit based on the firmware data of the main core micro control unit, the secret key and the main core message authentication code.

In some embodiments, the second responding unit includes: an instruction sending unit configured to send an instruction for starting up the main core micro control unit to start up the main core micro control unit, herein after the main core micro control unit is started up, a communication connection is established between the main core micro control unit and the first data transmission micro control unit; and a first verification data obtaining unit configured to obtain the verification data in response to the communication connection being established between the main core micro control unit and the first data transmission micro control unit, herein the verification data is corresponding to the first data transmission micro control unit.

In some embodiments, after the main core micro control unit is started up, a communication connection is established between the first data transmission micro control unit and the second data transmission micro control unit, and the first verification data obtaining unit is further configured to: obtain the verification data in response to the first data transmission micro control unit passing the verification and the communication connection being established between the first data transmission micro control unit and the second data transmission micro control unit, herein the verification data is corresponding to the second data transmission micro control unit.

In some embodiments, the verification data further includes hardware data of the one of the first data transmission micro control unit and the second data transmission micro control unit.

In some embodiments, the hardware security module further includes: a third responding unit configured to send, in response to the main core micro control unit failing to pass the verification, a starting up termination instruction to terminate the starting up of the battery management system.

In a seventh aspect, the present application provides a main core micro control unit for starting up a battery management system including a plurality of battery management units, the plurality of battery management units including at least a first battery management unit and a second battery management unit, the first battery management unit including the main core micro control unit, a first data transmission micro control unit and a hardware security module, the second battery management unit including a second data transmission micro control unit, and the main core micro control unit including: a receiving unit configured to receive verification data, herein the verification data is corresponding to one of the first data transmission micro control unit and the second data transmission micro control unit and includes firmware data of the one of the first data transmission micro control unit and the second data transmission micro control unit; and a sending unit configured to send the verification data to the hardware security module, so that the hardware security module verifies the one of the first data transmission micro control unit and the second data transmission micro control unit based on the verification data.

In the technical solutions of the embodiments of the present application, the main core micro control unit receives the verification data corresponding to the data transmission micro control unit of each of the plurality of battery management units and send the received verification data to the hardware security module, so that the main core micro control unit can achieve the data transmission between the hardware security module and the data transmission micro control unit of each of the plurality of battery management units, and no additional data transmission structure is required, thus the cost is further reduced.

In some embodiments, the verification data further includes hardware data of the one of the first data transmission micro control unit and the second data transmission micro control unit.

In some embodiments, the main core micro control unit further includes: a responding unit configured to send, in response to the one of the first data transmission micro control unit and the second data transmission micro control unit failing to pass the verification, a fault alarm to indicate that the one of the first data transmission micro control unit and the second data transmission micro control unit is faulty.

In an eighth aspect, the present application provides a data transmission micro control unit for starting up a battery management system including a plurality of battery management units, the plurality of battery management units including at least a first battery management unit and a second battery management unit, the first battery management unit including a main core micro control unit, a first data transmission micro control unit and a hardware security module, the second battery management unit including a second data transmission micro control unit, at least one of the first data transmission micro control unit and the second data transmission micro control unit being implemented by the data transmission micro control unit, and the data transmission micro control unit including: a sending unit configured to send verification data, so that the main core micro control unit receives the verification data and sends the verification data to the hardware security module, and the hardware security module verifies a corresponding one of the first data transmission micro control unit and the second data transmission micro control unit based on the verification data, herein the verification data is corresponding to one of the first data transmission micro control unit and the second data transmission micro control unit and includes firmware data of the one of the first data transmission micro control unit and the second data transmission micro control unit.

In the technical solutions of the embodiments of the present application, in starting up the battery management system, the verification data including the firmware data of the first data transmission micro control unit of the first battery management unit or the second data transmission micro control unit of the second battery management unit is sent to the main core micro control unit, and further sent to the hardware security module by the main core micro control unit. The hardware security module verifies the data transmission micro control unit corresponding to the firmware data based on the received verification data, a comprehensive verification can be achieved for the battery management system, thereby avoiding the firmware data of the data transmission micro control unit of any one of the battery management units from being tampered, which affects the security of the battery management system. In addition, the verification data is sent to the main core micro control unit and further sent to the hardware security module by the main core micro control unit, one hardware security module and one main core micro control unit can be utilized to verify each of the plurality of battery management units included in the battery management system, the manufacturing cost of the battery management system is reduced.

In some embodiments, the verification data is corresponding to the second data transmission micro control unit, the first data transmission micro control unit is implemented by the data transmission micro control unit, and the data transmission micro control unit further includes: a receiving unit configured to receive encrypted data sent by the second data transmission micro control unit; and a decrypting unit configured to decrypt the encrypted data to obtain the verification data.

In some embodiments, the verification data is corresponding to the second data transmission micro control unit, the second data transmission micro control unit is implemented by the data transmission micro control unit, and the sending unit includes: an encrypting unit configured to encrypt the verification data to obtain encrypted data; and a sending subunit configured to send the encrypted data to the first data transmission micro control unit, so that the first data transmission micro control unit decrypts the encrypted data and sends the data to the main core micro control unit.

In some embodiments, the verification data further includes hardware data of the one of the first data transmission micro control unit and the second data transmission micro control unit.

In a ninth aspect, the present application provides a battery management unit including the main core micro control unit of the embodiments of the present application, the data transmission micro control unit of the embodiments of the present application, and the hardware security module of the embodiments of the present application.

In a tenth aspect, the present application provides a battery management unit including the data transmission micro control unit of the embodiments of the present application.

In an eleventh aspect, the present application provides a battery management system including a plurality of battery management units, the plurality of battery management units including the battery management units of the embodiments of the present application.

In a twelfth aspect, the present application provides a battery including the battery management system of the embodiments of the present application.

In a thirteenth aspect, the present application provides an electrical device including the battery of the embodiments of the present application for providing electrical energy.

In a fourteenth aspect, the present application provides an electronic device, including: at least one processor; and a memory communicatively coupled to the at least one processor; herein the memory stores instructions executable by the at least one processor, and the instructions, when executed by the at least one processor, cause the at least one processor to perform the method of any one of the embodiments of the present application.

In a fifteenth aspect, the present application provides a non-transitory computer readable storage medium storing computer instructions for causing a computer to perform the method of the embodiments of the present application.

In a sixteenth aspect, the present application provides a computer program product including a computer program, herein the computer program, when executed by a processor, implements the method of the embodiments of the present application.

The above description is only an overview of the technical solutions of the present application, so that the technical means of the present application and can be clearly understood and implemented according to the description. Further, the detailed description of the present application is exemplified below for understanding the above and other purposes, features and advantages of the present application.

BRIEF DESCRIPTION OF THE DRAWINGS

Various other advantages and benefits will become apparent to those of ordinary skill in the art upon reading the following detailed description of the preferred embodiments. The accompanying drawings are merely for illustrating the preferred embodiments and are not to be considered limiting of the present application. Further, throughout the accompanying drawings, the same reference numerals denotes the same elements. In the accompanying drawings.

DETAILED DESCRIPTION

Figure 1:
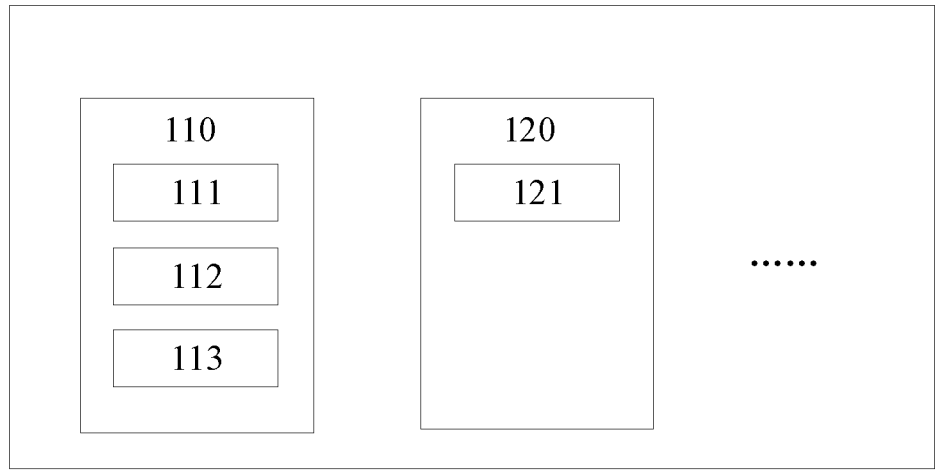
FIG. 1 shows a structural block diagram of a battery management system in a method for manufacturing a battery management system according to some embodiments of the present application.

Embodiments of the technical solutions of the present application will be described in detail below in conjunction with the accompanying drawings. The following embodiments are merely for illustrating the technical solutions of the present application more clearly and thus only used as examples, and should not limit the protection scope of the present application.

Unless otherwise defined, all technical and scientific terms used herein have the same meaning as commonly understood by those skilled in the technical field of the present application; the terms used herein are only for describing the specific embodiments, without intending to limit the present application; the terms "comprise" and "have" and any variations thereof in the description, claims and the above brief description of the drawings in the present application are intended to encompass a non-exclusive inclusion.

In the description of the embodiments of the present application, the terms "first", "second" and the like are only used to distinguish different objects, and should not be understood as indicating or implying relative importance or implicitly indicating a quantity, a specific order, or a primary-secondary relationship of the indicated technical features. In the description of the embodiments of the present application, "a plurality of" means two or more, unless otherwise specifically defined.

Reference herein to an "embodiment" means that a particular feature, structure, or characteristic described in connection with the embodiment can be included in at least one of the embodiments of the present application. The appearances of the phrase in various places in the specification are not necessarily all referring to the same embodiment, nor a separate or alternative embodiment that is mutually exclusive of other embodiments. It is explicitly or implicitly understood by those skilled in the art that the embodiments described herein may be combined with other embodiments.

In the description of the embodiments of the present application, the term "and/or" is only an association relationship for describing the related objects, indicating that there may be three relationships, such as A and/or B may indicate: A alone, both A and B, and B alone. In addition, the character "I" herein generally indicates that the related objects are in an "or" relationship.

In the description of the embodiments of the present application, the term "a plurality of" means two or more (including the case of two), and similarly, "a plurality group of" means two or more groups (including the case of two groups), "a plurality slice of" means two or more slices (including the case of two slices).

In the description of the embodiments of the present application, the orientation or positional relationship indicated by the terms "center", "longitudinal", "latitudinal", "length", "width", "thickness", "up", "down", "front", "rear", "left", "right" "vertical", "horizontal", "top", "bottom", "inside", "outside", "clockwise", "counterclockwise", "axial", "radial", "circumferential" and the like are based on the accompanying drawings. These terms are only for the convenience of describing the embodiments of the present application and simplifying the description, rather than indicating or implying that the indicated device or element must have a specific orientation or be constructed and operated in a specific orientation, and therefore should not be understood as limiting of the embodiments of the present application.

In the description of the embodiments of the present application, unless otherwise clearly defined and specified, terms such as "install", "couple", "connect", "fix" should be understood in a broad sense, for example, a fixed connection, a detachable connection or an integral body; a mechanical connection or an electrical connection; a direct connection, an indirect connection via an intermediate medium, or interaction or internal communication of two elements. Those of ordinary skill in the art may understand the specific meanings of the above terms in the embodiments of the present application according to specific situations.

At present, from the perspective of the development of the market situation, the application of power batteries is more and more extensive. In the application of the power batteries, battery management systems are often utilized to manage the power batteries. In the existing battery management system, a hardware security module is often utilized to perform security verification on firmware data of the battery management unit in the battery management system, so as to avoid tampering of the firmware data, which causes security risks in the application of the power battery.

It has been noticed that, in the related art, in the security verification on firmware data of the battery management unit in the battery management system by the hardware security module, only the battery management unit in which the hardware security module is located is verified. For a battery management system including a plurality of battery management units, the verification cannot be performed on each of the battery management units, and thus a comprehensive verification for the battery management units cannot be achieved. In order to verify each of the battery management units, it is necessary to configure a hardware security module for each of the battery management units, resulting in huge cost consumption.

The battery management system according to the embodiments of the present application may be used, but not limited to, in an electrical device such as a vehicle, a ship or an aircraft. The method for manufacturing a battery management system according to the present application may be used to manufacture a battery management system, so that when the battery management system is started up, each of the plurality of battery management units included in the battery management system can be verified, so as to achieve a comprehensive verification for the battery management system to ensure the safety of the battery management system.

Embodiments of the present application provide an electrical device using a battery including a battery management system as a power source, which may be a cell phone, a tablet, a laptop, an electric toy, an electric tool, a battery car, an electric vehicle, a ship, a spacecraft, etc. The electric toy may include a stationary or mobile electric toy, such as a game console, an electric car toy, an electric ship toy and an electric airplane toy, etc., and the spacecraft may include an airplane, a rocket, a space shuttle and a spaceship, etc.

In order to achieve a comprehensive verification for a battery management system including a plurality of battery management units, the present application provides a method for manufacturing and starting up a battery management system.

Referring to FIG. 1, a battery management system 100 according to some embodiments of the present application includes a plurality of battery management units, the plurality of battery management units include a first battery management unit 110 and a second battery management unit 120, the first battery management unit 110 includes a main core micro control unit 111, a first data transmission micro control unit 112 and a hardware security module 113, and the second battery management unit 120 includes a second data transmission micro control unit 121.

Figure 2:
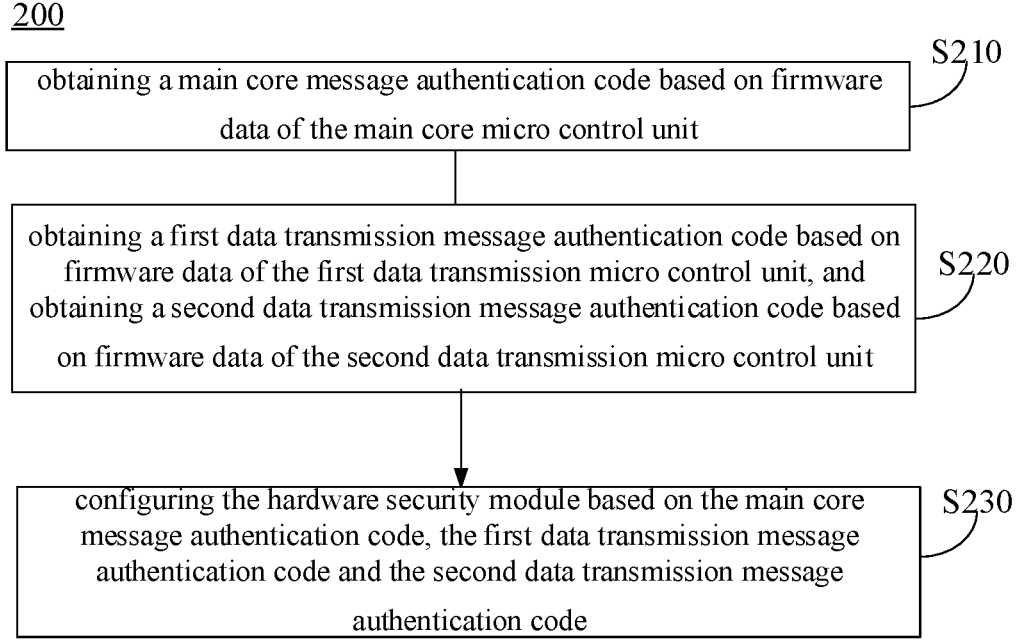
FIG. 2 shows a schematic flowchart of a method for manufacturing a battery management system according to some embodiments of the present application.

Referring to FIG. 2, a method for manufacturing the battery management system 100 according to some embodiments of the present application includes the following steps:

Step S210: obtaining a main core message authentication code based on firmware data of the main core micro control unit.

Step S220: obtaining a first data transmission message authentication code based on firmware data of the first data transmission micro control unit, and obtaining a second data transmission message authentication code based on firmware data of the second data transmission micro control unit.

Step S230: configuring the hardware security module based on the main core message authentication code, the first data transmission message authentication code and the second data transmission message authentication code, so that the battery management system verifies the plurality of battery management units based on the hardware security module at starting up.

In some embodiments, the battery management system 100 is a battery package or battery module composed of a plurality of batteries, or a battery PACK.

In some embodiments, each of the plurality of battery management units is an assembled printed circuit board, i.e., a PCBA board.

In some embodiments, among the plurality of battery management units in the battery management system 100, only the first battery management unit 110 includes the main core micro control unit 111. The main core micro control unit 111 is the decision center in the battery management system 100 and configured to control each of the battery management units based on the data collected by each of the battery management units in the battery management system 100, so as to make the battery management system operate normally.

In some embodiments, the second battery management unit 120 is any one of the plurality of battery management units in the battery management system 100 other than the first battery management unit 110.

In some embodiments, each of the plurality of battery management units has a component for acquiring data of the battery managed by the battery management unit. In some examples, the data of the battery may include cell temperature, voltage, and the like.

In some embodiments, each of the plurality of battery management units in the battery management system 100 has a corresponding data transmission micro control unit which is configured to collect the data acquired by the battery management unit and send the collected data to the first battery management unit 110 in which the main core micro control unit 111 is located, so that the main core micro control unit 111 makes a decision based on the received data and issues a decision instruction for the data transmission micro control unit of the battery management unit to receive. In some embodiments, the data transmission micro control unit of each of the plurality of battery management units in the battery management system 100 further controls the managed battery based on the received decision instruction, for example, controls the connection or disconnection between the managed battery and an external circuit.

In some embodiments, wire communication is performed between the main core micro control unit 111 and the first data transmission micro control unit 112 of the first battery management unit 110 in which the main core micro control unit 111 is located, so as to exchange data and instructions. The wire communication between the main core micro control unit 111 and the first data transmission micro control unit 112 avoids loss and theft of data and instructions, and makes the transmission of data and instructions more secure. In other embodiments, wireless communication may be performed between the main core micro control unit 111 and the first data transmission micro control unit 112.

In some embodiments, wireless communication is performed between the first data transmission micro control unit 112 of the first battery management unit 110 in which the main core micro control unit 111 is located and the second data transmission micro control unit 121 of the second battery management unit 120 to exchange of data and instructions. The wireless communication between the first data transmission micro control unit 112 and the second data transmission micro control unit 121 makes the assembly of the battery management system more convenient and space-saving. In other embodiments, wire communication may be performed between the first data transmission micro control unit 112 and the second data transmission micro control unit 121.

In some embodiments, the first battery management unit 110 in which the main core micro control unit 111 is located further includes the hardware security module 113 to obtain the firmware data of the main core micro control unit 111 and perform security verification on the main core micro control unit 111 based on the firmware data.

In some embodiments, the firmware data is related to application code of the battery management unit, such as the installation program of the application. The hardware security module 113 performs security verification on the main core micro control unit 111 to verify the application code on the main core micro control unit 111, so as to avoid the firmware data of the main core micro control unit 111 from being tampered, which causes decision problems of the main core micro control unit 111, and to avoid safety problems of the battery management system 100.

In the embodiments according to the present application, the battery management system 100 is manufactured based on steps 210-230, so that the manufactured battery management system 100 can verify each of the plurality of battery management units included in the battery management system 100 by the hardware security module 113 at starting up, and a comprehensive verification is achieved for the battery management system.

In some embodiments, step S210 is implemented in the hardware security module 113. The hardware security module 113 reads the firmware data of the main core micro control unit 111, and calculates a hash value of the firmware data based on the firmware data as the main core message authentication code of the main core micro control unit 111.

In some embodiments, step S210 is implemented by a message authentication code generating device. The message authentication code generating device may be, for example, an electronic device including a memory storing instructions and a processor. In an example, the message authentication code generating device is an upper computer for the battery management unit when the battery management unit rolls off the production line. For example, when the first battery management unit 110 rolls off the production line, the upper computer performs a hash operation based on the firmware data and the hardware data of the main core micro control unit 111 to obtain the main core message authentication code, so that the subsequent verification on the main core micro control unit 111 is not only based on the firmware data, but also based on the hardware data, thereby preventing the hardware data of the main core micro control unit 111 from being tampered.

In some embodiments, step S220 is implemented by a message authentication code generating device. The message authentication code generating device may be, for example, an electronic device including a memory storing instructions and a processor. In an example, the message authentication code generating device is an upper computer for the battery management unit when the battery management unit rolls off the production line. For example, when the first battery management unit 110 rolls off the production line, the upper computer performs a hash operation based on the firmware data of the first data transmission micro control unit 112 to obtain a hash value of the firmware data, which is used as the first data transmission message authentication code of the first data transmission micro control unit 112; and when the second battery management unit 120 rolls off the production line, the upper computer performs a hash operation based on the firmware data of the second data transmission micro control unit 121 to obtain a hash value of the firmware data, which is used as the second data transmission message authentication code of the second data transmission micro control unit 121.

In some embodiments, step S230 is implemented by a message authentication code writing device. The message authentication code writing device may be, for example, an electronic device including a memory storing instructions and a processor. In an example, the message authentication code writing device is an upper computer for the battery management unit when the battery management unit rolls off the production line. For example, when the first battery management unit 110 and the second battery management unit 120 roll off the production line, the upper computer writes the main core message authentication code, the first data transmission message authentication code and the second data transmission message authentication code into the hardware security module 113.

In some embodiments, step S210 is implemented in the hardware security module 113. The hardware security module 113 stores the main core message authentication code and is configured based on the main core message authentication code.

In manufacturing the battery management system, for the main core micro control unit 111, the main core message authentication code is obtained based on its firmware data; for the first data transmission micro control unit 112 of the first battery management unit 110 included in the battery management system, the first data transmission message authentication code is obtained based on its firmware data; for the second data transmission micro control unit 121 of the second battery management unit 120, the second data transmission message authentication code is obtained based on its firmware data; and finally the hardware security module 113 is configured based on the main core message authentication code, the first data transmission message authentication code and the second data transmission message authentication code, so that the battery management system 100 is able to separately verify the first battery management unit 110 and the second battery management unit 120 in the plurality of battery management units included in the battery management system based on the configured hardware security module at starting up. A comprehensive verification is achieved for the battery management system including a plurality of battery management units, thereby avoiding the firmware data of the data transmission micro control unit of any one of the battery management units from being tampered, which affects the security of the battery management system. Moreover, in the technical solutions of the embodiments of the present application, only one hardware security module 113 can be utilized to verify each of the plurality of battery management units included in the battery management system, the manufacturing cost is low.

Figure 3:
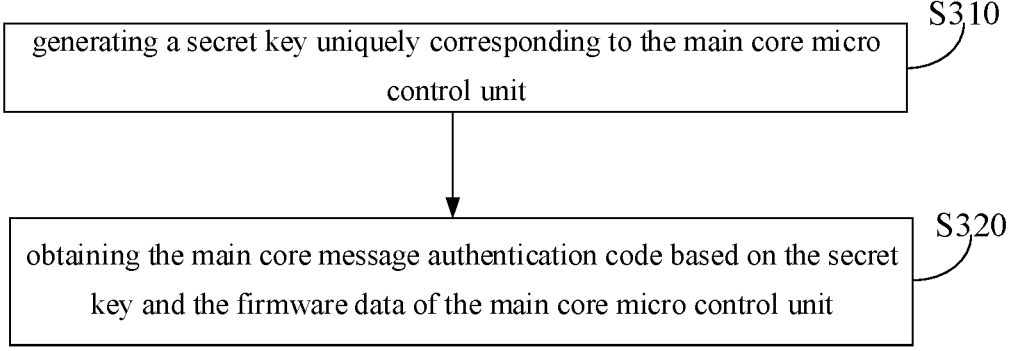
FIG. 3 shows a flowchart of a process of obtaining a main core message authentication code based on firmware data of a main core micro control unit in a method for manufacturing a battery management system according to some embodiments of the present application.

According to some embodiments of the present application, as shown in FIG. 3, obtaining a main core message authentication code based on firmware data of the main core micro control unit includes the following steps.

Step S310: generating a secret key uniquely corresponding to the main core micro control unit.

Step S320: obtaining the main core message authentication code based on the secret key and the firmware data of the main core micro control unit.

Herein, step S230, configuring the hardware security module based on the main core message authentication code, the first data transmission message authentication code and the second data transmission message authentication code, further includes:

configuring the hardware security module based on the secret key, the main core message authentication code, the first data transmission message authentication code and the second data transmission message authentication code.

In some embodiments, step 310 is implemented by a secret key generating device. The secret key generating device may be, for example, an electronic device including a memory storing instructions and a processor, and the processor may generate the secret key uniquely corresponding to the main core micro control unit 111 when executing the instructions.

In some embodiments, step 310 is implemented by both of the main core micro control unit 111 and the hardware security module 113. The main core micro control unit 111 generates the secret key uniquely corresponding to the main core micro control unit 111 at the hardware security module 113 through a random number generator. For example, the secret key is a symmetric secret key. The secret key is generated by the main core micro control unit rather than injected externally, thus is more secure and confidential.

In some embodiments, step S320 is implemented by the hardware security module 113. For example, the hardware security module 113 reads the firmware data of the main core micro control unit 111 and calculates a hash value of the firmware data based on the firmware data; and the hardware security module 113 obtain the message authentication codes based on the secret key generated in step S310 and the hash value of the firmware data.

In some embodiments, the process of configuring the hardware security module based on the secret key, the main core message authentication code, the first data transmission message authentication code and the second data transmission message authentication code is implemented by a message authentication code writing device.

In some embodiments, step 310 is implemented by the hardware security module 113. The hardware security module 113 stores the secret key and is configured based on the secret key.

The secret key uniquely corresponding to the main core micro control unit is generated, and the main core message authentication code of the main core micro control unit is generated based on the secret key and the firmware data of the main core micro control unit, since the secret key is uniquely corresponding to the main core micro control unit, an one-to-one correspondence is achieved between the secret key and the main core micro control unit, and the safety of the battery management system is further ensured.

Figure 4:
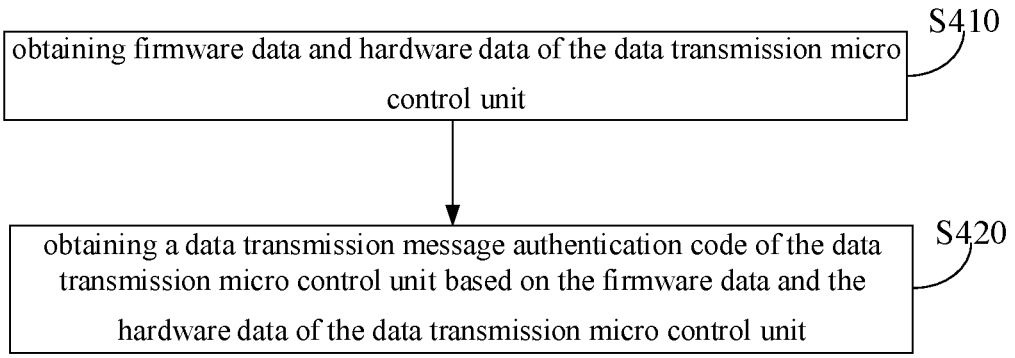
FIG. 4 shows a flowchart of a process of obtaining a data transmission message authentication code based on firmware data of a data transmission micro control unit in a method for manufacturing a battery management system according to some embodiments of the present application.

According to some embodiments of the present application, as shown in FIG. 4, for each of the first data transmission micro control unit and the second data transmission micro control unit, obtaining a first data transmission message authentication code based on firmware data of the first data transmission micro control unit and obtaining a second data transmission message authentication code based on firmware data of the second data transmission micro control unit include the following steps.

Step S410: obtaining firmware data and hardware data of the data transmission micro control unit.

Step S420: obtaining a data transmission message authentication code of the data transmission micro control unit based on the firmware data and the hardware data of the data transmission micro control unit.

In some embodiments, the hardware data may be any hardware code specific to the data transmission micro control unit.

In an example, the hardware data is the read only memory code (ROM code) of the data transmission micro control unit.

In some embodiments, in step S420, obtaining a data transmission message authentication code of the data transmission micro control unit based on the firmware data and the hardware data of the data transmission micro control unit includes: performing a hash operation based on the firmware data and the hardware data of the data transmission micro control unit to obtain a hash value; and use the hash value as the data transmission message authentication code of the data transmission micro control unit.

In obtaining the data transmission message authentication code based on the firmware data of the first data transmission micro control unit 112 of the first battery management unit 110 of the plurality of battery management units, the first data transmission message authentication code is obtained further based on the hardware data of the first data transmission micro control unit 112, so that the obtained first data transmission message authentication code is further associated with the hardware data. Then, when the battery management system verifies the first data transmission micro control unit 112 based on the configured hardware security module 113 at starting up, the hardware data the first data transmission micro control unit 112 is further verified, which avoids the hardware of the first data transmission micro control unit 112 from being replaced, the safety of the battery management system is further ensured. Similarly, the second data transmission message authentication code is obtained based on the firmware data and the hardware data of the second data transmission micro control unit 121 of the second battery management unit 120 of the plurality of battery management units, the safety of the battery management system is further ensured.

Figure 5:
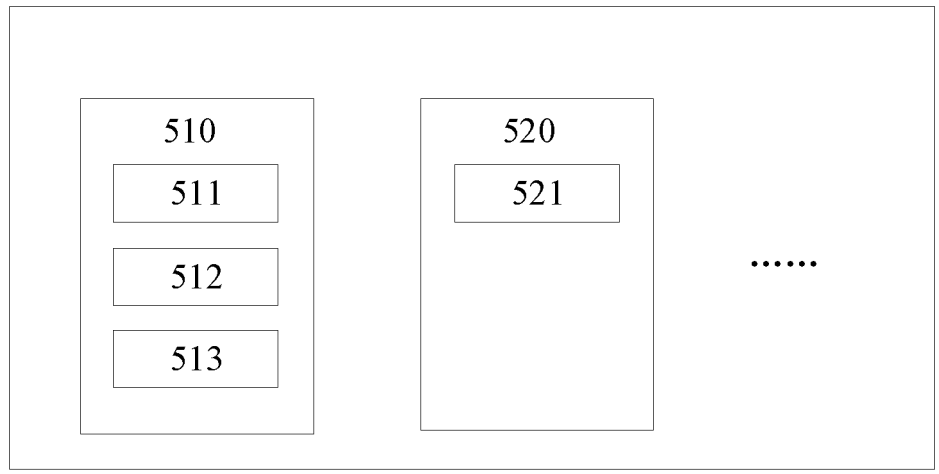
FIG. 5 shows a structural block diagram of a battery management system in a method for starting up a battery management system according to some embodiments of the present application.

According to some embodiments of the present application, a method for starting up a battery management system is further provided. The battery management system may be manufactured according to the method for manufacturing a battery management system in FIGS. 1-4. Referring to FIG. 5, the battery management system 500 in the method for starting up a battery management system according to the present application includes a first battery management unit 510 and a second battery management unit 520, the first battery management unit 510 includes a main core micro control unit 511, a first data transmission micro control unit 512 and a hardware security module 513, and the second battery management unit 520 includes a second data transmission micro control unit 521.

Figure 6:
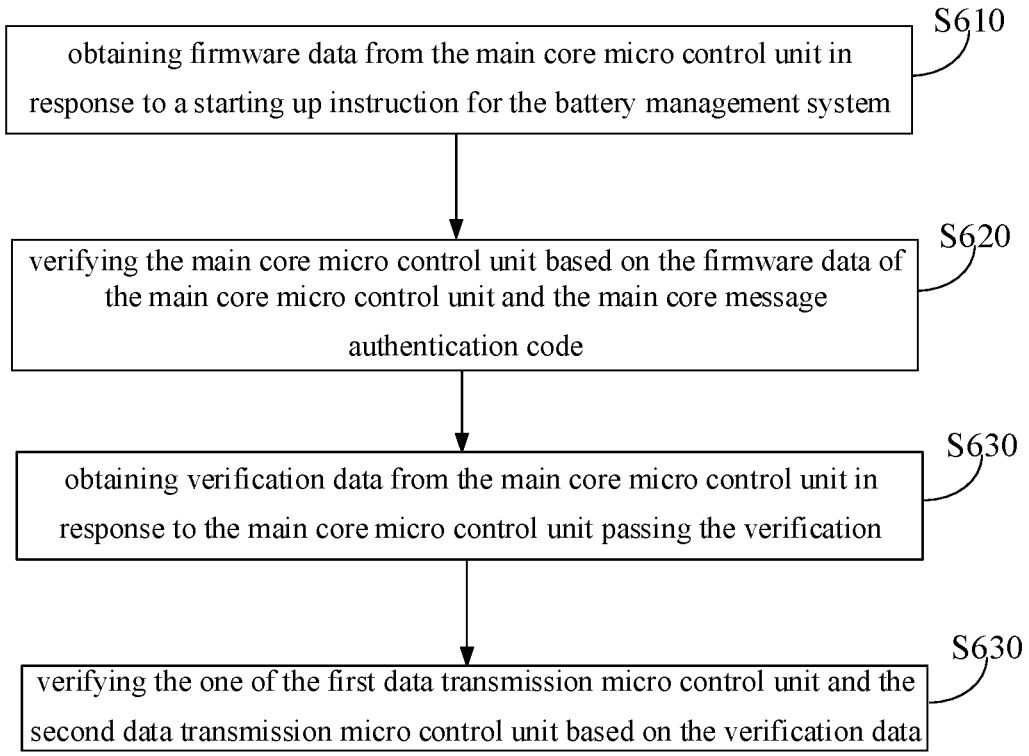
FIG. 6 shows a schematic flowchart of a method for starting up a battery management system according to some embodiments of the present application.

Referring to FIG. 6, the method 600 for starting up a battery management system according to the present application may be performed by the hardware security module 513 and includes the following steps.

Step S610: obtaining firmware data from the main core micro control unit in response to a starting up instruction for the battery management system.

Step S620: verifying the main core micro control unit based on the firmware data of the main core micro control unit and the main core message authentication code.

Step S630: obtaining verification data from the main core micro control unit in response to the main core micro control unit passing the verification.

Step S640: verifying the one of the first data transmission micro control unit and the second data transmission micro control unit based on the verification data.

In step S630, the verification data is corresponding to one of the first data transmission micro control unit and the second data transmission micro control unit and includes firmware data of the one of the first data transmission micro control unit and the second data transmission micro control unit.

It should be noted that the method for starting up a battery management system according to the present application is used to verify whether the plurality of battery management units included in the battery management system are the same as the plurality of battery management units in the manufacturing process of the battery management system, and thus the plurality of battery management units included in the battery management system 500 which is verified in the verification process may be the same or different from the plurality of battery management units included in the battery management system 100 which is manufactured in the manufacturing process, which is not limited herein. Nonetheless, it is clear that the hardware security module 513 included in the battery management system 500 which is verified in the verification process is the same as the hardware security module 113 included in the battery management system 100 which is manufactured in the manufacturing process, and that the plurality of battery management units included in the battery management system 500 which is verified in the verification process are in one-to-one correspondence with the plurality of battery management units included in the battery management system 100 which is manufactured in the manufacturing process. That is, the battery management system 100 which is manufactured in the manufacturing process includes the first battery management unit 110 and the second battery management unit 120, then the battery management system 500 which is verified in the verification process includes the first battery management unit 510 and the second battery management unit 520, in which the first battery management unit 110 is corresponding to the first battery management unit 510, and the second battery management unit 120 is corresponding to the second battery management unit 520.

Further, it should be noted that "the first battery management unit 110 is corresponding to the first battery management unit 510" may indicate correspondence in position, consistency in function or consistency of the included components and the like, which is not limited herein, as long as the verification for the first battery management unit 510, when the battery management system is started up, is for verifying whether it is the same as the first battery management unit 110 and is not tampered or replaced. The same definition further applies to "the second battery management unit 120 is corresponding to the second battery management unit 520".

Figure 7:
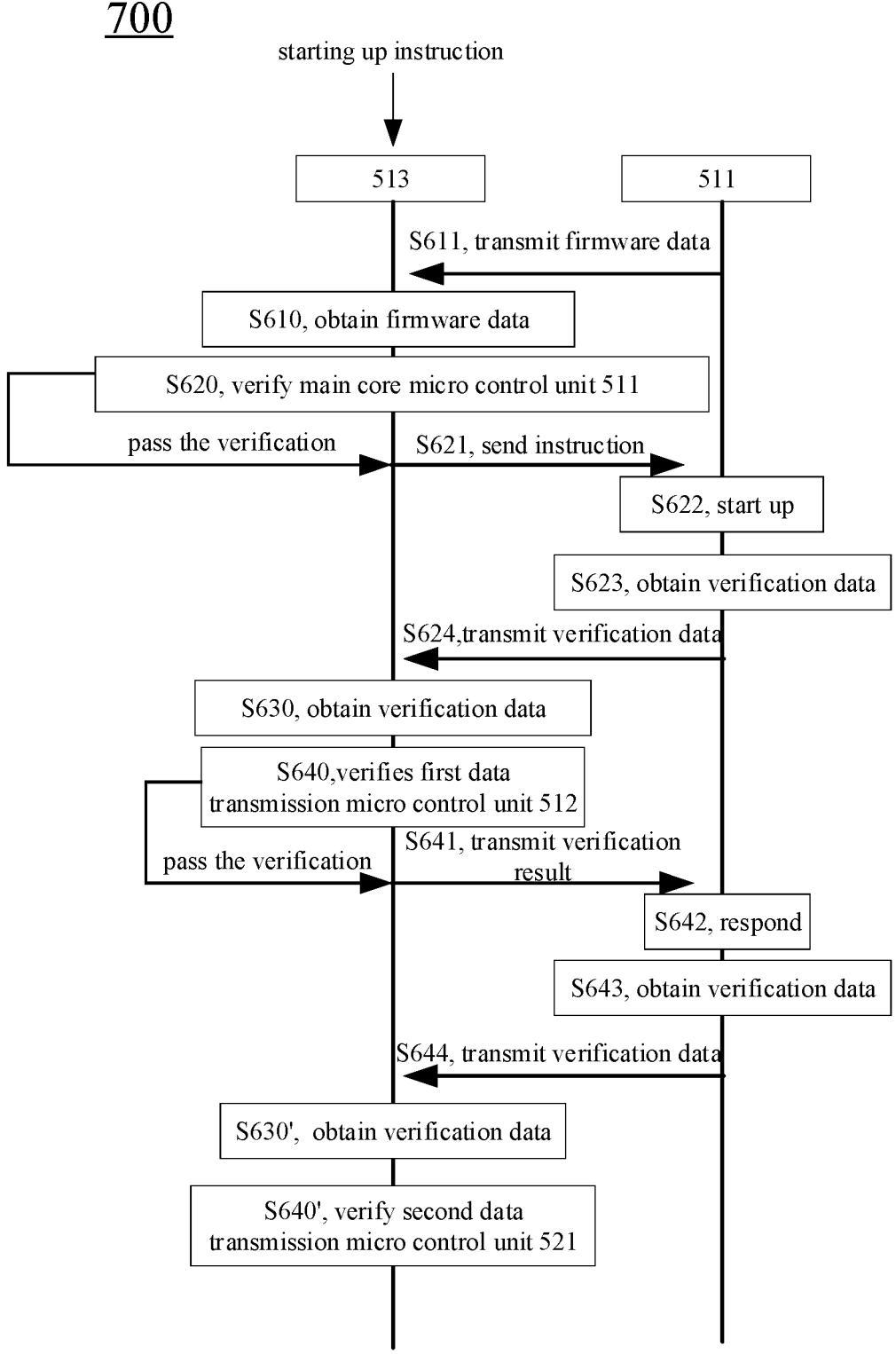
FIG. 7 shows a schematic diagram of an interaction process between a hardware security module and a main core micro control unit in a method for starting up a battery management system according to some embodiments of the present application.

In some embodiments, the method 600 is performed by the hardware security module 513, in which the hardware security module 513 implements the method 600 through its interactions with the main core micro control unit 511. Referring to FIG. 7 next, which illustrates an interaction process 700 between the hardware security module 513 and the main core micro control unit 511 in the method 600 for starting up a battery management system according to the present application.

It is understood that the implementation of the method 600 by the hardware security module 513 is only exemplary, and those skilled in the art should understand that the method 600 may be performed by an electronic device including a memory storing instructions and a processor, in which the processor implements, when executing the instructions, the various steps of the method 600.

Referring to FIG. 7, the interaction process 700 between the hardware security module 513 and the main core micro control unit 511 includes the following steps.

In step S611, the main core micro control unit 511 transmits its firmware data to the hardware security module 513.

In step S610, the hardware security module 513 obtains the firmware data of the main core micro control unit 511.

In step S620, the hardware security module 513 verifies the main core micro control unit 511 based on the firmware data of the main core micro control unit 511.

In step S621, the hardware security module 513 sends an instruction for starting up the main core micro control unit 511 in response to the main core micro control unit 511 passing the verification.

In step S622, the main core micro control unit 511 starts up in response to the instruction.

In step S623, after the main core micro control unit 511 starts up, verification data is further obtained from the first data transmission micro control unit 512.

In step S624, the main core micro control unit 511 transmits the verification data to the hardware security module 513.

In step S630, the hardware security module 513 receives the verification data and achieves the obtaining of the verification data.

In step S640, the hardware security module 513 verifies the first data transmission micro control unit 512 based on the received verification data.

In some embodiments, the interaction process 700 between the hardware security module 513 and the main core micro control unit 511 further includes the following steps.

In step S641, the hardware security module 513 transmits the result that the first data transmission micro control unit 512 passes the verification to the main core micro control unit 511.

In step S642, the main core micro control unit 511 responds to the result that the first data transmission micro control unit 512 passes the verification.

In step S643, the main core micro control unit 511 obtains verification data from the second data transmission micro control unit 521.

In step S644, the main core micro control unit 511 transmits the verification data to the hardware security module 513.

In step S630', the hardware security module 513 receives the verification data and achieves the obtaining of the verification data.

In step S640', the hardware security module 513 verifies the second data transmission micro control unit 521 based on the received verification data.

In some embodiments, the starting up instruction for the battery management system may be an instruction for powering up the battery management system 500. In other embodiments, the starting up instruction for the battery management system may be an electrical signal.

In some embodiments, the starting up instruction for the battery management system is issued for the hardware security module 513. In other embodiments, the starting up instruction for the battery management system is issued for the main core micro control unit 511.

In other embodiments, the hardware security module 513 implements step S610 by reading the verification data in the main core micro control unit 511.

In some embodiments, in step S620, the hardware security module 513 performs a hash operation based on the firmware data of the main core micro control unit 511 and obtains a hash value of the firmware data as a verification code, which is compared with the main core message authentication code of the main core micro control unit 511 stored in the hardware security module 513. If the verification code is the same as the main core message authentication code, the main core micro control unit 511 passes the verification; otherwise, the main core micro control unit 511 fails the verification.

In some embodiments, after the main core micro control unit 511 passes the verification, the first data transmission micro control unit 512 or the second data transmission micro control unit 521 sends its verification data to the main core micro control unit 511. In other embodiments, the second data transmission micro control unit 521 transmits the verification data to the first data transmission micro control unit 512 to further transmit the verification data to the main core micro control unit 511 through the first data transmission micro control unit 512.

In some embodiments, after receiving the verification data, the main core micro control unit 511 sends the verification data to the hardware security module 513, so that the hardware security module 513 implements step S630.

In some embodiments, in step S640, the hardware security module 513 performs a hash operation based on the received verification data to obtain a verification code for the data transmission micro control unit corresponding to the verification data, and verifies the corresponding data transmission micro control unit based on the verification code and the data transmission message authentication code of the corresponding data transmission micro control unit.

In starting up the battery management system 500, the main core micro control unit 511 is first verified based on the firmware data of the main core micro control unit 511 and the main core message authentication code, and after the main core micro control unit 511 passes the verification, the verification data of the first data transmission micro control unit 512 of the first battery management unit 510 or the second data transmission micro control unit 521 of the second battery management unit 520 of the plurality of battery management units included in the battery management system is obtained from the main core micro control unit 511, and the verification data includes the firmware data of the corresponding data transmission micro control unit. The plurality of data transmission micro control units of the plurality of battery management units in the battery management system 500 are separately verified based on the obtained verification data, and thus a comprehensive verification is achieved for the battery management system 500 including a plurality of battery management units, thereby avoiding the firmware data of the data transmission micro control unit of any one of the battery management units from being tampered, which affects the security of the battery management system. In addition, in the technical solutions of the embodiments of the present application, the hardware security module installed in the battery management unit in which the main core micro control unit is located can be utilized to verify each of the plurality of battery management units included in the battery management system, the manufacturing cost is low.

According to some embodiments of the present application, the main core micro control unit 511 has a unique corresponding secret key, and in step S610, verifying the main core micro control unit based on the firmware data of the main core micro control unit and the main core message authentication code includes: verifying the main core micro control unit based on the firmware data of the main core micro control unit, the secret key and the main core message authentication code.

In some embodiments, in the method for manufacturing a battery management system as described with reference to FIGS. 1-4, the main core message authentication code is obtained based on the firmware data and the unique corresponding secret key of the main core micro control unit 511; then in verifying the main core micro control unit 511, the verification code of the main core micro control unit 511 is also obtained based on the firmware data and the secret key of the main core micro control unit 511, in which obtaining the verification code based on the firmware data and the secret key of the main core micro control unit 511 includes: obtaining a hash value of the firmware data of the main core micro control unit 511 based on the firmware data; and obtaining the verification code based on the hash value of the firmware data and the secret key.

The main core micro control unit 511 is verified further based on the secret key uniquely corresponding to the main core micro control unit, and since the secret key is uniquely corresponding to the system management unit, an one-to-one correspondence is achieved between the secret key and the system management unit, and the safety of the battery management system is further ensured.

According to some embodiments of the present application, the hardware security module 513 further implements step S630 through its interactions with the main core micro control unit 511 and interactions between the main core micro control unit 511 and the first data transmission micro control unit 512. In some embodiments, step S630, obtaining verification data from the main core micro-control unit, includes:

in response to a starting up instruction for the main core micro control unit, establishing a communication connection between the main core micro control unit and the first data transmission micro control unit after the main core micro control unit is started up; and obtaining the verification data in response to the communication connection being established between the main core micro control unit and the first data transmission micro control unit, in which the verification data is corresponding to the first data transmission micro control unit.

In some embodiments, after the main core micro control unit 511 is started up, an instruction for activating the first data transmission micro control unit 512 is issued to active the first data transmission micro control unit 512. After the first data transmission micro control unit 512 is activated, an instruction for activating the second data transmission micro control unit 521 is further issued to activate the second data transmission micro control unit 521.

In some embodiments, after the first data transmission micro control unit 512 is activated, a communication connection is established between the first data transmission micro control unit 512 and the main core micro control unit 511.

In some embodiments, after the second data transmission micro control unit 521 is activated, a communication connection is established between the second data transmission micro control unit 521 and the first data transmission micro control unit 512.

In some embodiments, after the communication connection between the first data transmission micro control unit 512 and the main core micro control unit 511 is established, the first data transmission micro control unit 512 sends its verification data to the main core micro control unit 511.

In some embodiments, after the communication connection between the second data transmission micro control unit 521 and the first data transmission micro control unit 512 is established, the second data transmission micro control unit 521 sends its verification data to the first data transmission micro control unit 512.

In some embodiments, the communication connection between the first data transmission micro control unit 512 and the main core micro control unit 511 is achieved through wire communication, thus when the first data transmission micro control unit 512 sends its verification data to the main core micro control unit 511, the risk of theft or tampering can be effectively reduced.

In some embodiments, the main core micro control unit 511 simultaneously issues the activating instructions for activating the first data transmission micro control unit 512 and the second data transmission micro control unit 521.

In some embodiments, the second data transmission micro control unit 521 receives the activating instruction and sends its verification data to the main core micro control unit 511 after being activated.

After the main core micro control unit 511 is verified and started up, with the communication connection established between the main core micro control unit 511 and the first data transmission micro control unit 512, the main core micro control unit 511 obtains the verification data of the first data transmission micro control unit 512, so that the verification data of the first data transmission micro control unit 512 can be obtained through the main core micro control unit 511 and no additional data transmission structure is required, thus the cost is further reduced.

According to some embodiments of the present application, the hardware security module 513 further implements step S630 through its interactions with the main core micro control unit 511, interactions between the main core micro control unit 511 and the first data transmission micro control unit 512, and interactions between the first data transmission micro control unit 512 and the second data transmission micro control unit 521.

In some embodiments, after the main core micro control unit is started up, a communication connection is established between the first data transmission micro control unit and the second data transmission micro control unit, and step S630, obtaining verification data from the main core micro control unit, further includes:

obtaining the verification data in response to the first data transmission micro control unit passing the verification and the communication connection being established between the first data transmission micro control unit and the second data transmission micro control unit, in which the verification data is corresponding to the second data transmission micro control unit.

In some embodiments, after the hardware security module 513 verifies the first data transmission micro control unit 512, the verification result is transmitted to the main core micro control unit 511, and the main core micro control unit 511 generates an instruction signal and send it to the second data transmission micro control unit 521, so that the second data transmission micro control unit 521 sends its verification data.

In some embodiments, the instruction signal generated by the main core micro control unit 511 is sent to the second data transmission micro control unit 521 through the first data transmission micro control unit 512.

After the main core micro control unit is verified and started up, with the communication connection established between the main core micro control unit and the first data transmission micro control unit and the communication connection established between the first data transmission micro control unit and the second data transmission micro control unit, the first data transmission micro control unit obtains the verification data sent by the second data transmission micro control unit and further sends the obtained verification data to the main core micro control unit, so that the verification data of the second data transmission micro control unit can be obtained through the main core micro control unit and the first data transmission micro control unit and no additional data transmission structure is required, thus the cost is further reduced.

According to some embodiments of the present application, the verification data further includes hardware data of the one of the first data transmission micro control unit and the second data transmission micro control unit.

In some embodiments, the hardware data may be any hardware code specific to the data transmission micro control unit.

In an example, the hardware data is the read only memory code (ROM code) of the data transmission micro control unit.

In some embodiments, in the method for manufacturing a battery management system as described with reference to FIGS. 1-4, the first data transmission message authentication code is obtained based on the firmware data and the hardware data of the first data transmission micro control unit 512; then in verifying the first data transmission micro control unit 512, the data transmission message authentication code is also obtained based on the firmware data and the hardware data of the first data transmission micro control unit 512, in which obtaining the data transmission message authentication code based on the firmware data and the hardware data of the first data transmission micro control unit 512 includes: performing hash calculation based on the firmware data and the hardware data of the first data transmission micro control unit 512 to obtain a hash value as the data transmission message authentication code of the first data transmission micro control unit 512. The same process is also applicable to the second data transmission micro control unit 521.

In verifying the first data transmission micro control unit 512 of the first battery management unit 510 of the plurality of battery management units in the battery management system, the verification is further based on the hardware data of the first data transmission micro control unit 512, which can further prevent the hardware of the first data transmission micro control unit 512 from being replaced, and the safety of the battery management system is further ensured. Similarly, for the second data transmission micro control unit 521 of the second battery management unit 520, the verification is based on its hardware data, and the safety of the battery management system is further ensured.

According to some embodiments of the present application, the method 600 further includes: sending, in response to the main core micro control unit failing to pass the verification, a starting up termination instruction to terminate the starting up of the battery management system.

The starting up termination instruction may be an instruction signal issued by the main core micro control unit 511, or an electrical signal generated by the main core micro control unit 511.

If the main core micro control unit fails to pass the verification, the starting up termination instruction is sent to terminate the starting up of the battery management system, so as to avoid subsequent invalid verification and prevent the battery management system from starting up and causing safety problems when the verification is failed.

According to some embodiments of the present application, a method for starting up a battery management system is further provided for starting up the battery management system manufactured based on the method for manufacturing a battery management system as described in FIGS. 1-4. The battery management system may be, for example, the battery management system 500 in FIG. 5. Referring to the method for starting up a battery management system described with reference to FIGS. 5-6 for the description of the battery management system 500.

Figure 8:
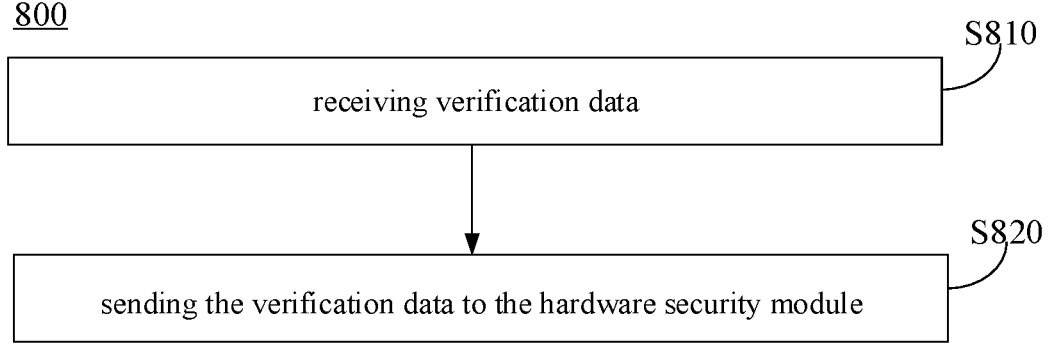
FIG. 8 shows a schematic flowchart of a method for starting up a battery management system according to some embodiments of the present application.

Referring to FIG. 8, the method 800 for starting up a battery management system according to the present application includes the following steps.

Step S810: receiving verification data.

Step S820: sending the verification data to the hardware security module.

In step S810, the verification data is corresponding to one of the first data transmission micro control unit and the second data transmission micro control unit and includes firmware data of the one of the first data transmission micro control unit and the second data transmission micro control unit. In step S820, the hardware security module verifies the one of the first data transmission micro control unit and the second data transmission micro control unit based on the verification data.

Figure 9:
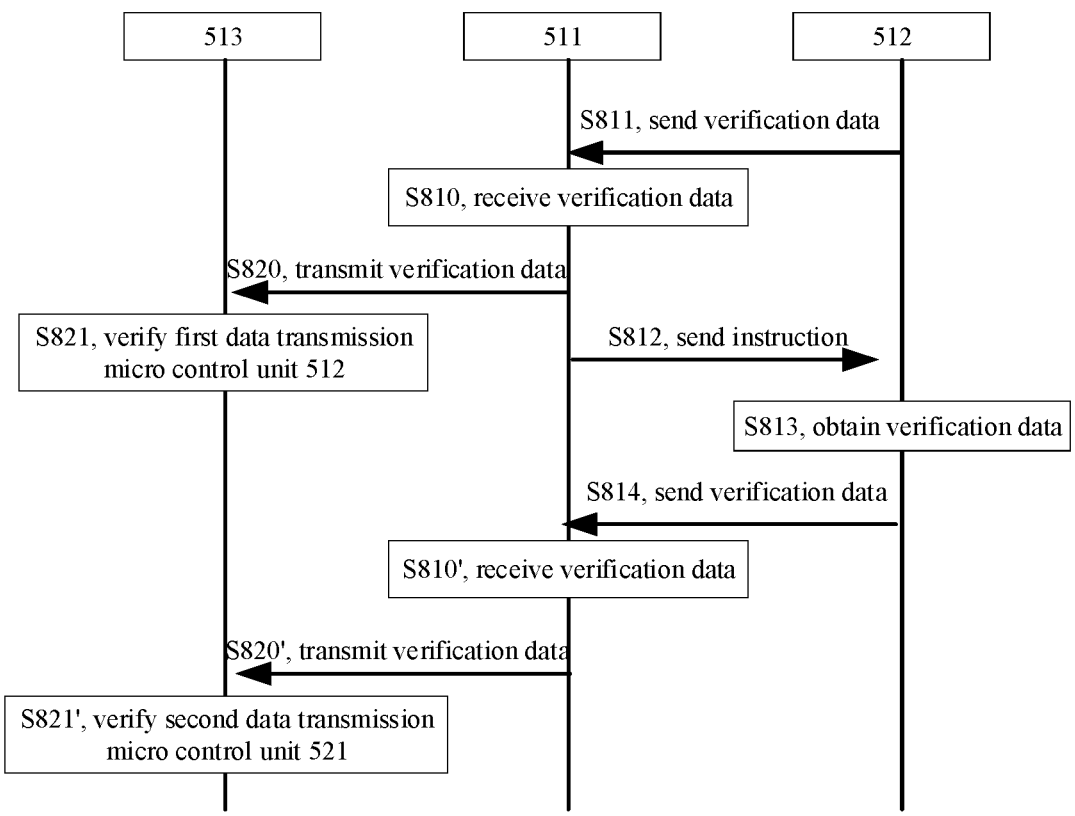
FIG. 9 shows a schematic diagram of an interaction process between a main core micro control unit and a hardware security module, a first data transmission micro control unit in a method for starting up a battery management system according to some embodiments of the present application.

In some embodiments, the method 800 is performed by the main core micro control unit 511, in which the main core micro control unit 511 implements the method 800 through its interactions with the hardware security module 513 and the first data transmission micro control unit 512. Referring to FIG. 9 next, which illustrates an interaction process 900 between the main core micro control unit 511 and the hardware security module 513, the first data transmission micro control unit 512 in the method 800 for starting up a battery management system according to the present application.

It is understood that the implementation of the method 800 by the main core micro control unit 511 is only exemplary, and those skilled in the art should understand that the method 800 may be performed by an electronic device including a memory storing instructions and a processor, in which the processor implements, when executing the instructions, the various steps of the method 800.

In some embodiments, as shown in FIG. 9, the interaction process 900 between the main core micro control unit 511 and the hardware security module 513, the first data transmission micro control unit 512 includes the following steps.

In step S811, the first data transmission micro control unit 512 sends its verification data to the main core micro control unit 511.

In step S810, the main core micro control unit 511 receives the verification data of the first data transmission micro control unit 512.

In step S820, the main core micro control unit 511 transmits the verification data of the first data transmission micro control unit 512 to the hardware security module 513.

In step S821, the hardware security module 513 verifies the first data transmission micro control unit 512 based on the received verification data.

In some embodiments, as shown in FIG. 9, the interaction process 900 between the main core micro control unit 511 and the hardware security module 513, the first data transmission micro control unit 512 includes the following steps.

In step S812, the main core micro control unit 511 sends an instruction to the first data transmission micro control unit 512, so that the first data transmission micro control unit 512 obtains the verification data of the second data transmission micro control unit 521.

In step S813, the first data transmission micro control unit 512 obtains the verification data of the second data transmission micro control unit 521.

In step S814, the first data transmission micro control unit 512 sends the verification data of the second data transmission micro control unit 521 to the main core micro control unit 511.

In step S810', the main core micro control unit 511 receives the verification data of the second data transmission micro control unit 521.

In step S820', the main core micro control unit 511 transmits the verification data of the second data transmission micro control unit 521 to the hardware security module 513.

In step S821', the hardware security module 513 verifies the second data transmission micro control unit 521 based on the received verification data.

In some embodiments, in step S812, the main core micro control unit 511 sends the instruction in response to receiving the result that the first data transmission micro control unit 512 passes the verification sent by the hardware security module 513.

In some embodiments, the communication connection between the first data transmission micro control unit 512 and the main core micro control unit 511 is achieved through wire communication, thus when the first data transmission micro control unit 512 sends its verification data to the main core micro control unit 511, the risk of theft or tampering can be effectively reduced. The main core micro control unit 511 further transmits the received verification data to the hardware security module 513, which verifies the first data transmission micro control unit 512 based on the verification data.

In starting up the battery management system, the verification data of the data transmission micro control unit of any one of the plurality of battery management units included in the battery management system is sent to the hardware security module, and the verification data includes the firmware data. The hardware security module can verify the data transmission micro control unit of any one of the plurality of battery management units based on the obtained verification data, a comprehensive verification can be achieved for the battery management system, thereby avoiding the firmware data of the data transmission micro control unit of any one of the battery management units from being tampered, which affects the security of the battery management system. In addition, in the technical solutions of the embodiments of the present application, through receiving and sending the verification data, one hardware security module can be utilized to verify each of the plurality of battery management units included in the battery management system, the manufacturing cost is low.

According to some embodiments of the present application, the verification data further includes hardware data of the one of the first data transmission micro control unit and the second data transmission micro control unit.

In some embodiments, the hardware data may be any hardware code specific to the data transmission micro control unit.

In an example, the hardware data is the read only memory code of the data transmission micro control unit.

The received and sent verification data further includes the hardware data, so that the data transmission micro control unit of each of the plurality of battery management units in the battery management system is verified further based on the hardware data, which can further prevent the hardware of the data transmission micro control unit of each of the plurality of battery management units from being replaced, and the safety of the battery management system is further ensured.

According to some embodiments of the present application, the method 800 further includes: sending, in response to the one of the first data transmission micro control unit and the second data transmission micro control unit failing to pass the verification, a fault alarm to indicate that the one of the first data transmission micro control unit and the second data transmission micro control unit is faulty.

If the data transmission micro control unit fails to pass the verification, the fault alarm, which indicates that the data transmission micro control unit corresponding to the verification data is faulty, is sent to inform the user of the faulty battery management unit, without affecting the normal starting up of other verified battery management units.

According to some embodiments of the present application, a method for starting up a battery management system is further provided for starting up the battery management system manufactured based on the method for manufacturing a battery management system as described in FIGS. 1-4. The battery management system may be, for example, the battery management system 500 in FIG. 5. Referring to the method for starting up a battery management system described with reference to FIGS. 5-6 for the description of the battery management system 500.

Figure 10:
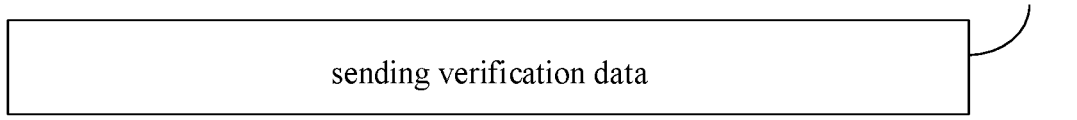
FIG. 10 shows a schematic flowchart of a method for starting up a battery management system according to some embodiments of the present application.

Referring to FIG. 10, the method 1000 for starting up a battery management system according to the present application includes the following step.

Step S1010: sending verification data, so that the main core micro control unit receives the verification data and sends the verification data to the hardware security module, and the hardware security module verifies a corresponding one of the first data transmission micro control unit and the second data transmission micro control unit based on the verification data.

The verification data is corresponding to one of the first data transmission micro control unit and the second data transmission micro control unit and includes firmware data of the one of the first data transmission micro control unit and the second data transmission micro control unit In some embodiments, the method 1000 is performed by the first data transmission micro control unit 512, in which the first data transmission micro control unit 512 implements the method 1000 through its interactions with the main core micro control unit 511 and the second data transmission micro control unit 521.

In other embodiments, the method 1000 may be performed by the second data transmission micro control unit 521, in which the second data transmission micro control unit 521 implements the method 1000 through its interactions with the first data transmission micro control unit 512.

It is understood that the implementation of the method 1000 by the first data transmission micro control unit 512 or the second data transmission micro control unit 521 is only exemplary, and those skilled in the art should understand that the method 1000 may be performed by an electronic device including a memory storing instructions and a processor, in which the processor implements, when executing the instructions, the various steps of the method 1000.

In some embodiments, the communication connection between the first data transmission micro control unit 512 and the main core micro control unit 511 is achieved through wire communication, thus when the first data transmission micro control unit 512 sends its verification data to the main core micro control unit 511, the risk of theft or tampering of the verification data of the first data transmission micro control unit can be effectively reduced. The main core micro control unit 511 further transmits the received verification data to the hardware security module 513, which verifies the first data transmission micro control unit 512 based on the verification data.

In some embodiments, the communication connection between the first data transmission micro control unit 512 and the second data transmission micro control unit 521 is achieved through wireless communication such as Bluetooth.

The verification data including the firmware data of the first data transmission micro control unit of the first battery management unit or the second data transmission micro control unit of the second battery management unit is sent to the main core micro control unit, and further sent to the hardware security module by the main core micro control unit. The hardware security module verifies the data transmission micro control unit corresponding to the firmware data based on the received verification data, a comprehensive verification can be achieved for the battery management system, thereby avoiding the firmware data of the data transmission micro control unit of any one of the battery management units from being tampered, which affects the security of the battery management system. In addition, the verification data is sent to the main core micro control unit and further sent to the hardware security module by the main core micro control unit, one hardware security module and one main core micro control unit can be utilized to verify each of the plurality of battery management units included in the battery management system, the manufacturing cost is low.

According to some embodiments of the present application, the method 1000 is performed by the first data transmission micro control unit 512, the verification data is corresponding to the second data transmission micro control unit, and the method 1000 further includes:

receiving encrypted data sent by the second data transmission micro control unit; and decrypting the encrypted data to obtain the verification data.

Figure 11:
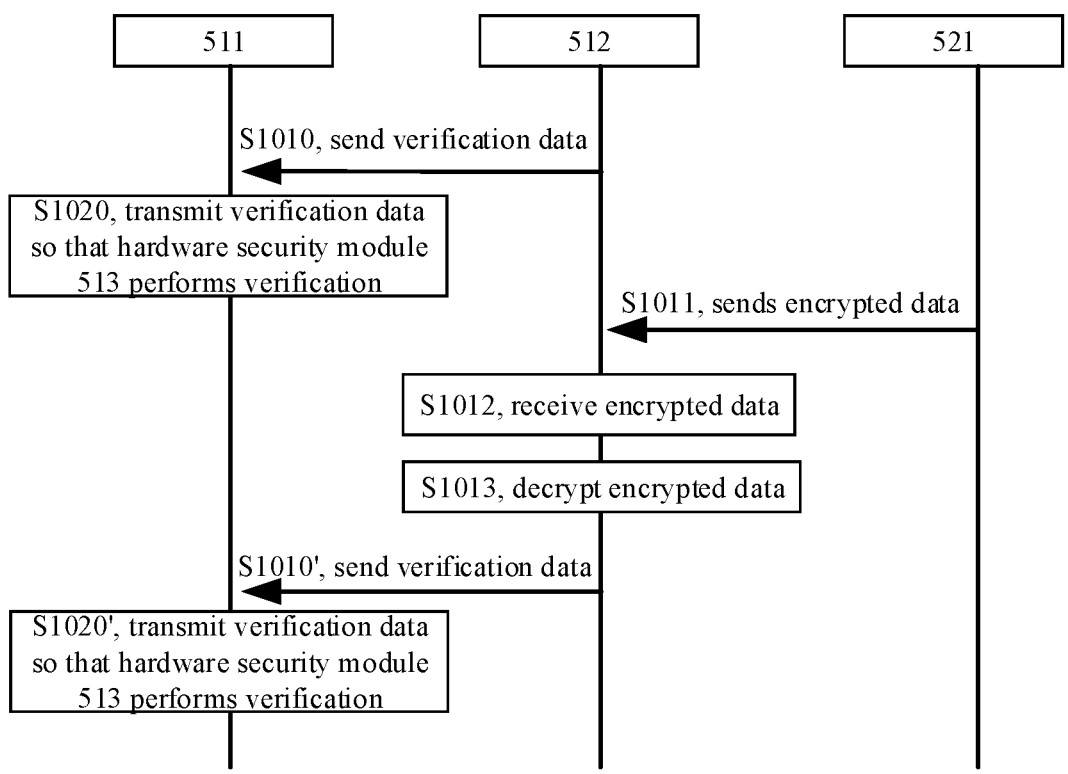
FIG. 11 shows a schematic diagram of an interaction process between a first data transmission micro control unit and a main core micro control unit, a second data transmission micro control unit in a method for starting up a battery management system according to some embodiments of the present application.

Referring to FIG. 11, which illustrates the implementation of the method 1000 by the first data transmission micro control unit 512 according to some embodiments of the present application. The first data transmission micro control unit 512 implements the method 1000 through an interaction process 1100 with the main core micro control unit 511 and the second data transmission micro control unit 521.

Referring to FIG. 11, in some embodiments, the interaction process 1100 between the first data transmission micro control unit 512 and the main core micro control unit 511, the second data transmission micro control unit 521 includes the following steps.

In step S1010, the first data transmission micro control unit 512 sends its verification data to the main core micro control unit 511.

In step S1020, the main core micro control unit 511 sends the verification data of the first data transmission micro control unit 512 to the hardware security module 513, so that the hardware security module 513 verifies the first data transmission micro control unit 512 based on the verification data, the method 1000 is completed.

In other embodiments, the interaction process 1100 between the first data transmission micro control unit 512 and the main core micro control unit 511, the second data transmission micro control unit 521 further includes the following steps.

In step S1011, the second data transmission micro control unit 521 sends its encrypted data to the first data transmission micro control unit 512.

In step S1012, the first data transmission micro control unit 512 receives the encrypted data.

In step S1013, the first data transmission micro control unit 512 decrypts the encrypted data to obtain the verification data of the second data transmission micro control unit 521.

In step S1010', the first data transmission micro control unit 512 sends the verification data of the second data transmission micro control unit 521 to the main core micro control unit 511.

In step S1020', the main core micro control unit 511 sends the verification data of the second data transmission micro control unit 521 to the hardware security module 513, so that the hardware security module 513 verifies the second data transmission micro control unit 521 based on the verification data, the method 1000 is completed.

In starting up the battery management system, the encrypted data is received from the second data transmission micro control unit and decrypted to obtain the verification data, so that the transmission of the verification data of the second data transmission micro control unit is encrypted, which ensures the security of at least the verification data from the second data transmission micro control unit, and further ensures the security of the starting up of the battery management system.

According to some embodiments of the present application, the method 1000 is performed by the second data transmission micro control unit 521, the verification data is corresponding to the second data transmission micro control unit, and the method 1000 further includes:

encrypting the verification data to obtain encrypted data; and sending the encrypted data to the first data transmission micro control unit, so that the first data transmission micro control unit decrypts the encrypted data and sends the data to the main core micro control unit.

Figure 12:
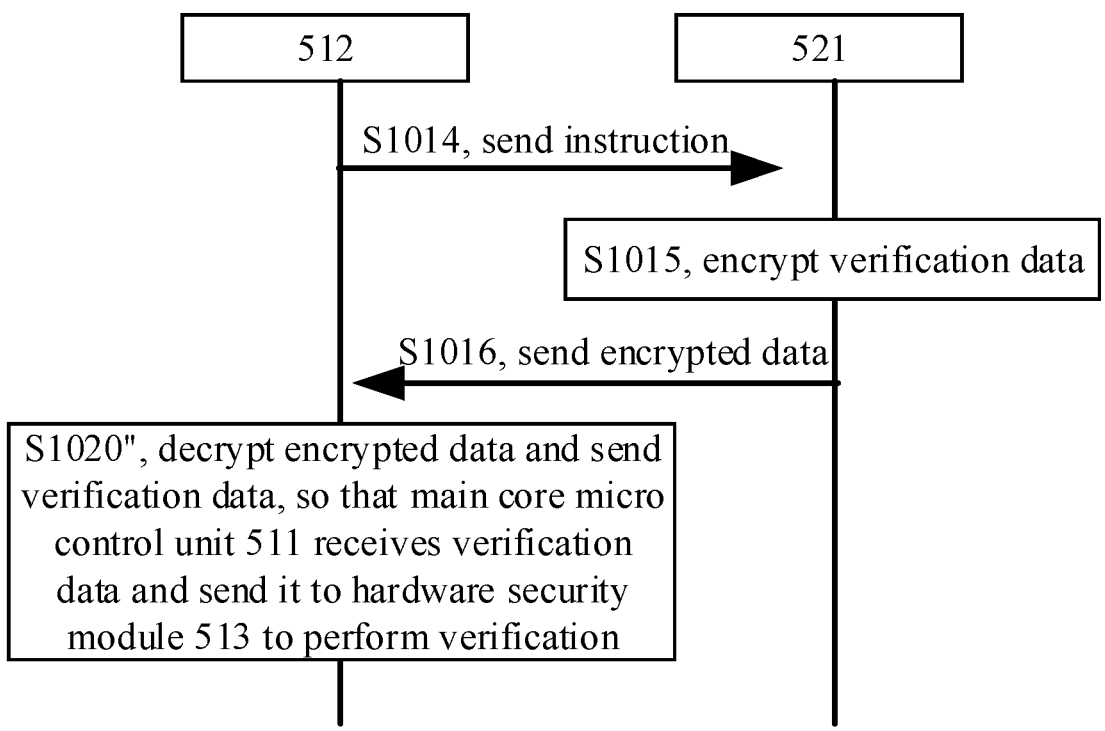
FIG. 12 shows a schematic diagram of an interaction process between a second data transmission micro control unit and a first data transmission micro control unit in a method for starting up a battery management system according to some embodiments of the present application.

Referring to FIG. 12, which illustrates the implementation of the method 1000 by the second data transmission micro control unit 521 according to some embodiments of the present application. The second data transmission micro control unit 521 implements the method 1000 through an interaction process 1200 with the first data transmission micro control unit 512.

Referring to FIG. 12, in some embodiments, the interaction process 1200 between the second data transmission micro control unit 521 and the first data transmission micro control unit 512 includes the following steps.

In step S1015, the second data transmission micro control unit 521 encrypts its verification data to obtain encrypted data.

In step S1016, the second data transmission micro control unit 521 sends the encrypted data to the first data transmission micro control unit 512.

In step S1020'', the first data transmission micro control unit 512 decrypts the received encrypted data and sends the verification data obtained by the decrypting to the main core micro control unit 511, so that the main core micro control unit 511 transmits the received verification data to the hardware security module 513 to verify the second data transmission micro control unit 521 based on the verification data, the method 1000 is completed.

In other embodiments, the interaction process 1100 between the first data transmission micro control unit 512 and the main core micro control unit 511, the second data transmission micro control unit 521 further includes the following steps.

In step S1014, the first data transmission micro control unit 512 sends an instruction to the second data transmission micro control unit 521, so that the second data transmission micro control unit 521 sends verification data to the first data transmission micro control unit 512.

In step S1015, the second data transmission micro control unit 521 encrypts its verification data in response to the received instruction to obtain encrypted data.

In step S1016, the second data transmission micro control unit 521 sends the encrypted data to the first data transmission micro control unit 512.

In step S1020'', the first data transmission micro control unit 512 decrypts the received encrypted data and sends the verification data obtained by the decrypting to the main core micro control unit 511, so that the main core micro control unit 511 transmits the received verification data to the hardware security module 513 to verify the second data transmission micro control unit 521 based on the verification data, the method 1000 is completed.

The verification data including the firmware data of the second data transmission micro control unit of the second battery management unit is encrypted and then sent to the first data transmission micro control unit of the first battery management unit, and sent to the main core micro control unit by the first data transmission micro control unit of the first battery management unit, and further sent to the hardware security module. The hardware security module verifies the data transmission micro control unit corresponding to the firmware data based on the received verification data, a comprehensive verification can be achieved for the battery management system, thereby avoiding the firmware data of the data transmission micro control unit of any one of the battery management units from being tampered, which affects the security of the battery management system.

According to some embodiments of the present application, the verification data further includes hardware data of the second data transmission micro control unit.

In some embodiments, the hardware data may be any hardware code specific to the data transmission micro control unit.

In an example, the hardware data is the read only memory code of the data transmission micro control unit.

The sent verification data further includes the hardware data, so that the data transmission micro control unit of each of the plurality of battery management units in the battery management system is verified further based on the hardware data, which can further prevent the hardware of the data transmission micro control unit of each of the plurality of battery management units from being replaced, and the safety of the battery management system is further ensured.

Figure 13:
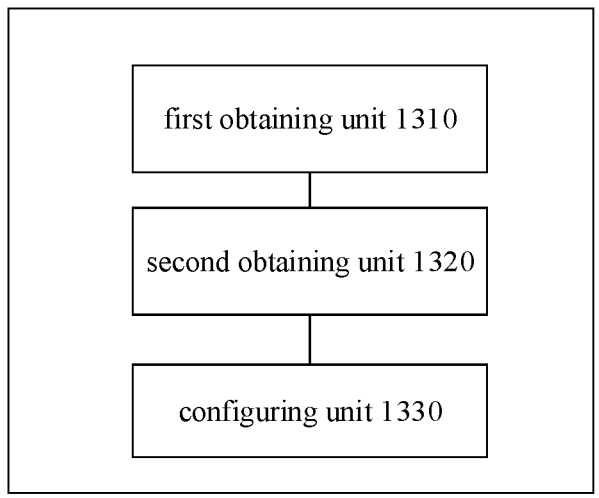
FIG. 13 shows a structural block diagram of an apparatus for manufacturing a battery management system according to some embodiments of the present application.

According to some embodiments of the present application, an apparatus for manufacturing a battery management system is further provided. The battery management system may refer to the battery management system 100 in the method for manufacturing a battery management system as described with reference to FIGS. 1-4. Referring to FIG. 13, the apparatus includes: a first obtaining unit 1310 configured to obtain a main core message authentication code based on firmware data of the main core micro control unit; a second obtaining unit 1320 configured to obtain a first data transmission message authentication code based on firmware data of the first data transmission micro control unit, and obtain a second data transmission message authentication code based on firmware data of the second data transmission micro control unit; and a configuring unit 1330 configured to configure the hardware security module based on the main core message authentication code, the first data transmission message authentication code and the second data transmission message authentication code, so that the battery management system verifies the plurality of battery management units based on the hardware security module at starting up.

In some embodiments, the first obtaining unit 1310 is implemented by the hardware security module 113 in the battery management system 100. The hardware security module 113 reads the firmware data of the main core micro control unit 111, and calculates a hash value of the firmware data based on the firmware data as the main core message authentication code of the main core micro control unit 111.

In some embodiments, the first obtaining unit 1310 is implemented by a message authentication code generating device. The message authentication code generating device may be, for example, an electronic device including a memory storing instructions and a processor. In an example, the message authentication code generating device is an upper computer for the battery management unit when the battery management unit rolls off the production line. For example, when the first battery management unit 110 rolls off the production line, the upper computer performs a hash operation based on the firmware data and the hardware data of the main core micro control unit 111 to obtain the main core message authentication code, so that the subsequent verification on the main core micro control unit 111 is not only based on the firmware data, but also based on the hardware data, thereby preventing the hardware data of the main core micro control unit 111 from being tampered.

In some embodiments, the second obtaining unit 1320 is implemented by a message authentication code generating device. The message authentication code generating device may be, for example, an electronic device including a memory storing instructions and a processor. In an example, the message authentication code generating device is an upper computer for the battery management unit when the battery management unit rolls off the production line. For example, when the first battery management unit 110 rolls off the production line, the upper computer performs a hash operation based on the firmware data of the first data transmission micro control unit 112 to obtain a hash value of the firmware data, which is used as the first data transmission message authentication code of the first data transmission micro control unit 112; and when the second battery management unit 120 rolls off the production line, the upper computer performs a hash operation based on the firmware data of the second data transmission micro control unit 121 to obtain a hash value of the firmware data, which is used as the second data transmission message authentication code of the second data transmission micro control unit 121.

In some embodiments, the configuring unit 1330 is implemented by a message authentication code writing device. The message authentication code writing device may be, for example, an electronic device including a memory storing instructions and a processor. In an example, the message authentication code writing device is an upper computer for the battery management unit when the battery management unit rolls off the production line. For example, when the first battery management unit 110 and the second battery management unit 120 roll off the production line, the upper computer writes the main core message authentication code, the first data transmission message authentication code and the second data transmission message authentication code into the hardware security module 113.

In some embodiments, under a condition that the first obtaining unit 1310 is implemented by the hardware security module 113, a part of the configuring unit 1330 is implemented by the hardware security module 113 to store the main core message authentication code.

In manufacturing the battery management system 100 by the apparatus 1000, for the data transmission micro control unit of each of the plurality of battery management units included in the battery management system 100, a corresponding data transmission message authentication code is obtained based on the firmware data of the data transmission micro control unit, and for the main core micro control unit 111, the main core message authentication code is obtained based on the firmware data of the main core micro control unit 111. In addition, the hardware security module 113 is configured based on the obtained corresponding data transmission message authentication codes and the main core message authentication code, so that the battery management system 100 is able to separately verify the firmware data of each of the plurality of battery management units included in the battery management system based on the configured hardware security 113 module at starting up. A comprehensive verification is achieved for the battery management system 100 including a plurality of battery management units, thereby avoiding the firmware data of the data transmission micro control unit of any one of the battery management units from being tampered, which affects the security of the battery management system 100. Moreover, in the technical solutions of the embodiments of the present application, only one hardware security module 113 can be utilized to verify each of the plurality of battery management units included in the battery management system, the manufacturing cost is low.

According to some embodiments of the present application, the first obtaining unit 1010 includes: a secret key generating unit configured to generate a secret key uniquely corresponding to the battery management unit; and a first obtaining subunit configured to obtain the main core message authentication code based on the secret key and the firmware data of the main core micro control unit, herein the configuring unit is configured to: configure the battery management system based on the secret key, the main core message authentication code and the plurality of data transmission message authentication codes.

According to some embodiments of the present application, the second obtaining unit includes: a second obtaining subunit configured to, for each of the first data transmission micro control unit and the second data transmission micro control unit, obtain firmware data and hardware data of the data transmission micro control unit; and a third obtaining subunit configured to, for each of the first data transmission micro control unit and the second data transmission micro control unit, obtain a data transmission message authentication code of the data transmission micro control unit based on the firmware data and the hardware data of the data transmission micro control unit.

Figure 14:
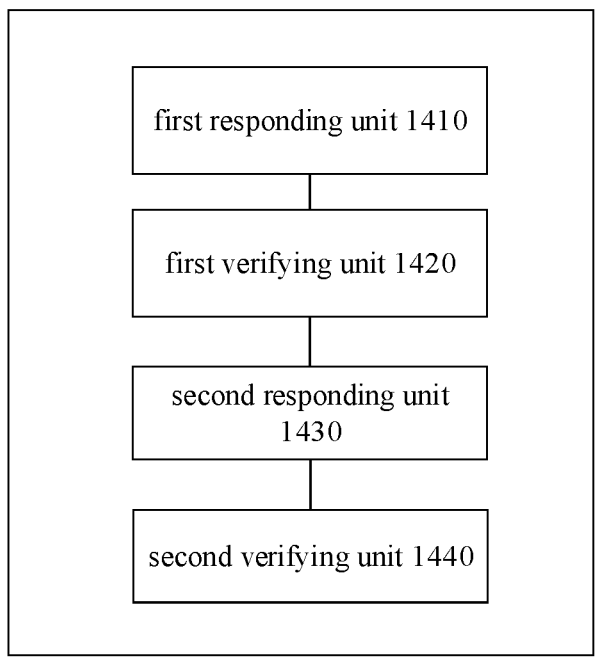
FIG. 14 shows a structural block diagram of a hardware security module according to some embodiments of the present application.

The present application provides a hardware security module for starting up a battery management system, the battery management system may be the battery management system 500 as described with reference to FIG. 5, in which the hardware security module 513 in the battery management system 500 may be implemented by the hardware security module 1400 in FIG. 14. Referring to FIG. 14, the hardware security module 1400 includes: a first responding unit 1410 configured to obtain firmware data from the main core micro control unit in response to a starting up instruction for the battery management system; a first verifying unit 1420 configured to verify the main core micro control unit based on the firmware data of the main core micro control unit and the main core message authentication code; a second responding unit 1430 configured to obtain verification data from the main core micro control unit in response to the main core micro control unit passing the verification, the verification data being corresponding to one of the first data transmission micro control unit and the second data transmission micro control unit and including firmware data of the one of the first data transmission micro control unit and the second data transmission micro control unit; and a second verifying unit 1440 configured to verify the one of the first data transmission micro control unit and the second data transmission micro control unit based on the verification data.

In starting up the battery management system, the main core micro control unit is first verified, by the hardware security module, based on the firmware data of the main core micro control unit and the main core message authentication code, and after the main core micro control unit passes the verification, the verification data of the plurality of data transmission micro control units of the plurality of battery management units included in the battery management system is obtained from the main core micro control unit, and the verification data includes the firmware data of the corresponding data transmission micro control unit. The plurality of data transmission micro control units of the plurality of battery management units are separately verified based on the obtained verification data, and thus a comprehensive verification is achieved for the battery management system including a plurality of battery management units, thereby avoiding the firmware data of the data transmission micro control unit of any one of the battery management units from being tampered, which affects the security of the battery management system. In addition, in the technical solutions of the embodiments of the present application, one hardware security module can be utilized to verify each of the plurality of battery management units included in the battery management system, the manufacturing cost is low.

The main core micro control unit has a unique corresponding secret key, and the first verifying unit is further configured to: verify the main core micro control unit based on the firmware data of the main core micro control unit, the secret key and the main core message authentication code.

In some embodiments, the second responding unit 1430 includes: an instruction sending unit configured to send an instruction for starting up the main core micro control unit to start up the main core micro control unit, herein after the main core micro control unit is started up, a communication connection is established between the main core micro control unit and the first data transmission micro control unit; and a first verification data obtaining unit configured to obtain the verification data from the main core micro control unit in response to the communication connection being established between the main core micro control unit and the first data transmission micro control unit, herein the verification data is corresponding to the first data transmission micro control unit.

In some embodiments, after the main core micro control unit is started up, a communication connection is established between the first data transmission micro control unit and the second data transmission micro control unit, and the first verification data obtaining unit is further configured to: obtain the verification data in response to the first data transmission micro control unit passing the verification and the communication connection being established between the first data transmission micro control unit and the second data transmission micro control unit, wherein the verification data is corresponding to the second data transmission micro control unit.

In some embodiments, the verification data further includes hardware data of the one of the first data transmission micro control unit and the second data transmission micro control unit.

In some embodiments, the hardware security module further includes: a third responding unit configured to send, in response to the main core micro control unit failing to pass the verification, a starting up termination instruction to terminate the starting up of the battery management system.

Figure 15:
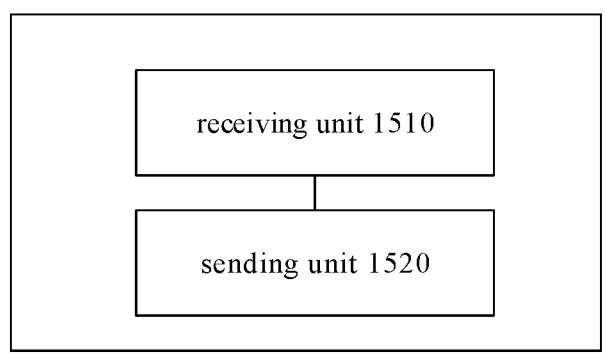
FIG. 15 shows a structural block diagram of a main core micro control unit according to some embodiments of the present application.

The present application provides a main core micro control unit for starting up a battery management system, the battery management system may be the battery management system 500 as described with reference to FIG. 5, in which the main core micro control unit 511 in the battery management system 500 may be implemented by the main core micro control unit 1500 in FIG. 15. Referring to FIG. 15, the main core micro control unit 1500 includes: a receiving unit 1510 configured to receive verification data, herein the verification data is corresponding to one of the first data transmission micro control unit and the second data transmission micro control unit and includes firmware data of the one of the first data transmission micro control unit and the second data transmission micro control unit; and a sending unit 1520 configured to send the verification data to the hardware security module, so that the hardware security module verifies the one of the first data transmission micro control unit and the second data transmission micro control unit based on the verification data.

In the technical solutions of the embodiments of the present application, the main core micro control unit receives the verification data corresponding to the data transmission micro control unit of each of the plurality of battery management units and send the received verification data to the hardware security module, so that the main core micro control unit can achieve the data transmission between the hardware security module and the data transmission micro control unit of each of the plurality of battery management units, and no additional data transmission structure is required, thus the cost is further reduced.

In some embodiments, the verification data further includes hardware data of the one of the first data transmission micro control unit and the second data transmission micro control unit.

In some embodiments, the main core micro control unit further includes: a responding unit configured to send, in response to the one of the first data transmission micro control unit and the second data transmission micro control unit failing to pass the verification, a fault alarm to indicate that the one of the first data transmission micro control unit and the second data transmission micro control unit is faulty.

Figure 16:
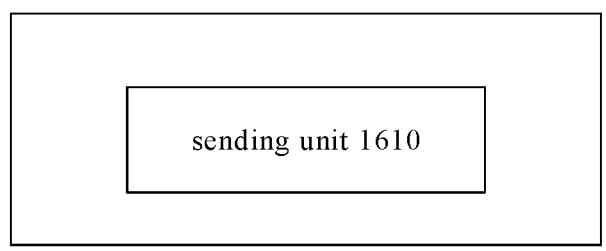
FIG. 16 shows a structural block diagram of a data transmission micro control unit according to some embodiments of the present application.

According to some embodiments of the present application, a data transmission micro control unit for starting up a battery management system is further provided, the battery management system may be the battery management system 500 as described with reference to FIG. 5, in which at least one of the first data transmission micro control unit 512 and the second data transmission micro control unit 521 in the battery management system 500 is implemented by the data transmission micro control unit 1600 in FIG. 16. Referring to FIG. 16, the data transmission micro control unit 1600 includes: a sending unit 1610 configured to send verification data, so that the main core micro control unit receives the verification data and sends the verification data to the hardware security module, and the hardware security module verifies a corresponding one of the first data transmission micro control unit and the second data transmission micro control unit based on the verification data.

The verification data is corresponding to one of the first data transmission micro control unit and the second data transmission micro control unit and includes firmware data of the one of the first data transmission micro control unit and the second data transmission micro control unit.

In the technical solutions of the embodiments of the present application, in starting up the battery management system, the verification data including the firmware data of the first data transmission micro control unit of the first battery management unit or the second data transmission micro control unit of the second battery management unit is sent to the main core micro control unit, and further sent to the hardware security module by the main core micro control unit. The hardware security module verifies the data transmission micro control unit corresponding to the firmware data based on the received verification data, a comprehensive verification can be achieved for the battery management system, thereby avoiding the firmware data of the data transmission micro control unit of any one of the battery management units from being tampered, which affects the security of the battery management system. In addition, the verification data is sent to the main core micro control unit and further sent to the hardware security module by the main core micro control unit, one hardware security module and one main core micro control unit can be utilized to verify each of the plurality of battery management units included in the battery management system, the manufacturing cost is low.

In some embodiments, the verification data is corresponding to the second data transmission micro control unit, the first data transmission micro control unit is implemented by the data transmission micro control unit, and the data transmission micro control unit further includes: a receiving unit configured to receive encrypted data sent by the second data transmission micro control unit; and a decrypting unit configured to decrypt the encrypted data to obtain the verification data.

In some embodiments, the verification data is corresponding to the second data transmission micro control unit, the second data transmission micro control unit is implemented by the data transmission micro control unit, and the sending unit includes: an encrypting unit configured to encrypt the verification data to obtain encrypted data; and a sending subunit configured to send the encrypted data to the first data transmission micro control unit, so that the first data transmission micro control unit decrypts the encrypted data and sends the data to the main core micro control unit.

In some embodiments, the verification data further includes hardware data of the one of the first data transmission micro control unit and the second data transmission micro control unit.

Figure 17:
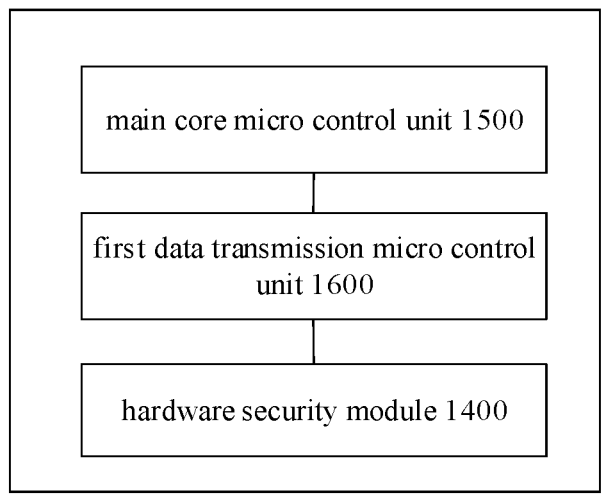
FIG. 17 shows a structural block diagram of a battery management unit according to some embodiments of the present application.

The present application provides a battery management unit. As shown in FIG. 17, the battery management unit 1700 includes: the main core micro control unit 1500 as described with reference to FIG. 15, the data transmission micro control unit 1600 as described with reference to FIG. 16, and the hardware security module 1400 as described with reference to FIG. 14.

Figure 18:
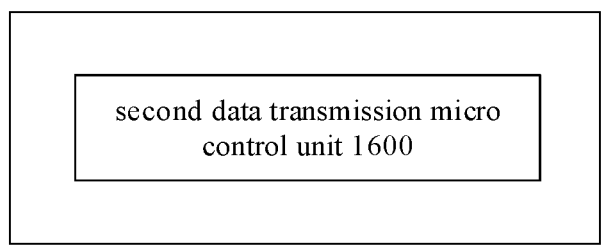
FIG. 18 shows a structural block diagram of a battery management unit according to some embodiments of the present application.

According to some embodiments of the present application, a battery management unit is further provided. As shown in FIG. 18, the battery management unit 1800 includes the data transmission micro control unit 1600 as described with reference to FIG. 16.

Figure 19:
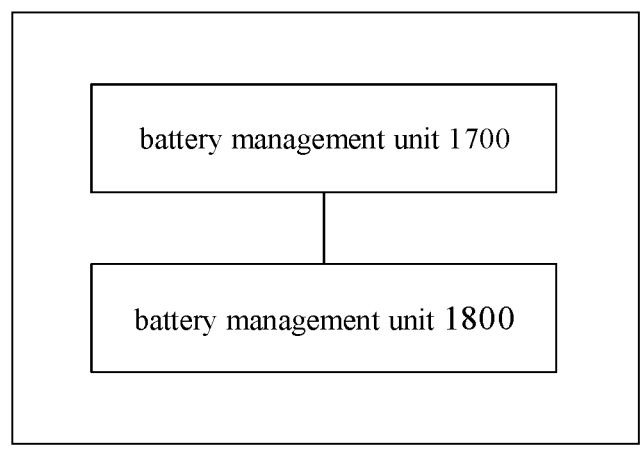
FIG. 19 shows a structural block diagram of a battery management system according to some embodiments of the present application.

According to some embodiments of the present application, a battery management system is further provided. As shown in FIG. 19, the battery management system 1900 includes a plurality of battery management units which include the battery management unit 1700 as described with reference to FIG. 17 and the battery management unit 1800 as described with reference to FIG. 18.

According to some embodiments of the present application, a battery 2000 is further provided, which includes the battery management system 1900 as described with reference to FIG. 19.

Figure 20:
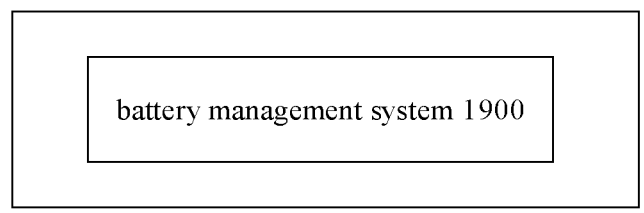
FIG. 20 shows a structural block diagram of a battery according to some embodiments of the present application.

According to some embodiments of the present application, an electrical device is further provided, which includes the battery 2000 as described with reference to FIG. 20 for providing electrical energy.

According to some embodiments of the present application, an electronic device is further provided, which includes: at least one processor; and a memory communicatively coupled to the at least one processor; herein the memory stores instructions executable by the at least one processor, and the instructions, when executed by the at least one processor, cause the at least one processor to perform the methods of the present application.

According to some embodiments of the present application, a non-transitory computer readable storage medium is further provided, which stores computer instructions for causing a computer to perform the methods of the present application.

According to some embodiments of the present application, a computer program product is further provided, which includes a computer program, the computer program, when executed by a processor, implements the methods of the present application.

According to some embodiments of the present application, referring to FIG. 6, the method 600 for starting up a battery management system according to the present application may be performed by the hardware security module 513 and includes: step S610: obtaining firmware data from the main core micro control unit in response to a starting up instruction for the battery management system; step S620: verifying the main core micro control unit based on the firmware data of the main core micro control unit and the main core message authentication code; step S630: obtaining verification data from the main core micro control unit in response to the main core micro control unit passing the verification; and step S640: verifying the one of the first data transmission micro control unit and the second data transmission micro control unit based on the verification data. In step S630, the verification data is corresponding to one of the first data transmission micro control unit and the second data transmission micro control unit and includes firmware data of the one of the first data transmission micro control unit and the second data transmission micro control unit.

Finally it should be noted that the above embodiments are used only to illustrate the technical solutions of the present application, but not to limit the present application. Although the present application has been described in detail with reference to the above embodiments, those of ordinary skill in the art should understood that the technical solutions in the above embodiments may be modified, or some or all of the technical features therein may be equivalently replaced. These modifications or replacements do not make the corresponding technical solutions deviate from the scope of the technical solutions of various embodiments of the present application, and shall be encompassed in the scope of the claims and description of the present application. In particular, as long as there is no structural conflict, each of the technical features mentioned in each of the embodiments can be combined in any manner. The present application is not limited to the specific embodiments disclosed herein, but includes all technical solutions falling within the scope of the claims.

What is claimed is:

1. A manufacturing method for a battery management system comprising a plurality of battery management units, the plurality of battery management units comprising a first battery management unit and a second battery management unit, the first battery management unit comprising a main core micro control unit, a first data transmission micro control unit and a hardware security module, the second battery management unit comprising a second data transmission micro control unit, and the method comprising:
   obtaining, by a manufacturing apparatus for the battery management system, a main core message authentication code based on firmware data of the main core micro control unit;
   obtaining, by the manufacturing apparatus, a first data transmission message authentication code based on firmware data of the first data transmission micro control unit, and obtaining a second data transmission message authentication code based on firmware data of the second data transmission micro control unit; and
   configuring, by the manufacturing apparatus, the hardware security module based on the main core message authentication code, the first data transmission message authentication code and the second data transmission message authentication code, including writing the main core message authentication code, the first data transmission message authentication code and the second data transmission message authentication code into the hardware security module, so that the battery management system verifies the plurality of battery management units based on using the hardware security module at starting up.

2. The method of claim 1, wherein the obtaining a main core message authentication code based on firmware data of the main core micro control unit comprises:
   generating, by the manufacturing apparatus, a secret key uniquely corresponding to the main core micro control unit; and
   obtaining, by the manufacturing apparatus, the main core message authentication code based on the secret key and the firmware data of the main core micro control unit,
   wherein configuring, by the manufacturing apparatus, the hardware security module based on the main core message authentication code, the first data transmission message authentication code and the second data transmission message authentication code further comprises:
      configuring, by the manufacturing apparatus, the hardware security module based on the secret key, the main core message authentication code, the first data transmission message authentication code and the second data transmission message authentication code.

3. The method of claim 1, wherein the obtaining, by the manufacturing apparatus, a first data transmission message authentication code based on firmware data of the first data transmission micro control unit, and obtaining a second data transmission message authentication code based on firmware data of the second data transmission micro control unit comprise:
   for each of the first data transmission micro control unit and the second data transmission micro control unit:
      obtaining, by the manufacturing apparatus, firmware data and hardware data of the data transmission micro control unit; and
      obtaining, by the manufacturing apparatus, a data transmission message authentication code of the data transmission micro control unit based on the firmware data and the hardware data of the data transmission micro control unit.

4. A method for starting up a battery management system comprising a plurality of battery management units, the plurality of battery management units comprising a first battery management unit and a second battery management unit, the first battery management unit comprising a main core micro control unit and a first data transmission micro control unit, the second battery management unit comprising a second data transmission micro control unit, the main core micro control unit having a corresponding main core message authentication code, the first data transmission micro control unit having a corresponding first data transmission message authentication code and the second data transmission micro control unit having a corresponding second data transmission message authentication code, and the method comprising:
   obtaining, by a hardware security module for starting up the battery management system, firmware data from the main core micro control unit in response to a starting up instruction for the battery management system;
   verifying, by the hardware security module, the main core micro control unit based on the firmware data of the main core micro control unit and the main core message authentication code;
   obtaining, by the hardware security module, verification data from the main core micro control unit in response to the main core micro control unit passing the verification, the verification data being corresponding to one of the first data transmission micro control unit and the second data transmission micro control unit and comprising firmware data of the one of the first data transmission micro control unit and the second data transmission micro control unit; and
   verifying, by the hardware security module, the one of the first data transmission micro control unit and the second data transmission micro control unit based at least on the verification data.

5. The method of claim 4, wherein the main core micro control unit has a unique corresponding secret key, and verifying, by the hardware security module, the main core micro control unit based on the firmware data of the main core micro control unit and the main core message authentication code comprises:
   verifying, by the hardware security module, the main core micro control unit based on the firmware data of the main core micro control unit, the secret key and the main core message authentication code.

6. The method of claim 4, wherein the obtaining, by the hardware security module, verification data from the main core micro control unit comprises:
   sending, by the hardware security module, an instruction for starting up the main core micro control unit to start up the main core micro control unit, wherein after the main core micro control unit is started up, a communication connection is established between the main core micro control unit and the first data transmission micro control unit; and obtaining, by the hardware security module, the verification data in response to the communication connection being established between the main core micro control unit and the first data transmission micro control unit, wherein the verification data is corresponding to the first data transmission micro control unit.

7. The method of claim 4, wherein after the main core micro control unit is started up, a communication connection is established between the first data transmission micro control unit and the second data transmission micro control unit, and obtaining, by the hardware security module, verification data from the main core micro control unit further comprises:

obtaining, by the hardware security module, the verification data in response to the first data transmission micro control unit passing the verification and the communication connection being established between the first data transmission micro control unit and the second data transmission micro control unit, wherein the verification data is corresponding to the second data transmission micro control unit.

8. The method of claim 4, wherein the verification data further comprises hardware data of the one of the first data transmission micro control unit and the second data transmission micro control unit.

9. The method of claim 4, further comprising:

sending, by the hardware security module in response to the main core micro control unit failing to pass the verification, a starting up termination instruction to terminate the starting up of the battery management system.

10. A hardware security module for starting up a battery management system comprising a plurality of battery management units, the plurality of battery management units comprising a first battery management unit and a second battery management unit, the first battery management unit comprising a main core micro control unit and a first data transmission micro control unit, the second battery management unit comprising a second data transmission micro control unit, the main core micro control unit having a corresponding main core message authentication code, the first data transmission micro control unit having a corresponding first data transmission message authentication code and the second data transmission micro control unit having a corresponding second data transmission message authentication code, and the hardware security module comprising:

at least one processor; and
a memory storing instructions that, when executed by the at least one processor, cause the at least one processor to:

obtain firmware data from the main core micro control unit in response to a starting up instruction for the battery management system;
verify the main core micro control unit based on the firmware data of the main core micro control unit and the main core message authentication code;
obtain verification data from the main core micro control unit in response to the main core micro control unit passing the verification, the verification data being corresponding to one of the first data transmission micro control unit and the second data transmission micro control unit and comprising firmware data of the one of the first data transmission micro control unit and the second data transmission micro control unit; and
verify the one of the first data transmission micro control unit and the second data transmission micro control unit based at least on the verification data.

11. The hardware security module of claim 10, wherein the main core micro control unit has a unique corresponding secret key, and the instructions, when executed by the at least one processor, further cause the at least one processor to:

verify the main core micro control unit based on the firmware data of the main core micro control unit, the secret key and the main core message authentication code.

12. The hardware security module of claim 10, wherein the instructions, when executed by the at least one processor, further cause the at least one processor to:

send an instruction for starting up the main core micro control unit to start up the main core micro control unit, wherein after the main core micro control unit is started up, a communication connection is established between the main core micro control unit and the first data transmission micro control unit; and
obtain the verification data in response to the communication connection being established between the main core micro control unit and the first data transmission micro control unit, wherein the verification data is corresponding to the first data transmission micro control unit.

13. The hardware security module of claim 10, wherein after the main core micro control unit is started up, a communication connection is established between the first data transmission micro control unit and the second data transmission micro control unit, and the instructions, when executed by the at least one processor, further cause the at least one processor to:

obtain the verification data in response to the first data transmission micro control unit passing the verification and the communication connection being established between the first data transmission micro control unit and the second data transmission micro control unit, wherein the verification data is corresponding to the second data transmission micro control unit.

14. The hardware security module of claim 10, wherein the verification data further comprises hardware data of the one of the first data transmission micro control unit and the second data transmission micro control unit.

15. The hardware security module of claim 10, wherein the instructions, when executed by the at least one processor, further cause the at least one processor to:

send, in response to the main core micro control unit failing to pass the verification, a starting up termination instruction to terminate the starting up of the battery management system.

* * * * *